(12) United States Patent
Kawano et al.

(10) Patent No.: US 11,833,887 B2
(45) Date of Patent: Dec. 5, 2023

(54) VEHICULAR AIR CONDITIONER

(71) Applicant: DENSO CORPORATION, Kariya (JP)

(72) Inventors: Hiroaki Kawano, Kariya (JP); Yoshiki Kato, Kariya (JP); Masamichi Makihara, Kariya (JP); Takahiro Maeda, Kariya (JP); Kuniyoshi Tanioka, Kariya (JP); Toru Okamura, Kariya (JP); Naoya Makimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 248 days.

(21) Appl. No.: 17/354,591

(22) Filed: Jun. 22, 2021

(65) Prior Publication Data

US 2021/0316594 A1    Oct. 14, 2021

Related U.S. Application Data

(63) Continuation of application No. PCT/JP2019/044815, filed on Nov. 15, 2019.

(30) Foreign Application Priority Data

Dec. 27, 2018    (JP) ................... 2018-244749

(51) Int. Cl.
*F25B 13/00*    (2006.01)
*B60H 1/03*    (2006.01)
*B60H 1/32*    (2006.01)

(52) U.S. Cl.
CPC ............. *B60H 1/034* (2013.01); *B60H 1/323* (2013.01); *B60H 1/3227* (2013.01)

(58) Field of Classification Search
CPC ....... B60H 1/034; B60H 1/3227; B60H 1/323
USPC ........................................................ 62/324.1
See application file for complete search history.

(56) References Cited

U.S. PATENT DOCUMENTS

| 2015/0128632 A1 | 5/2015 | Kishita et al. |
| 2018/0208014 A1 | 7/2018 | Ben Ahmed et al. |
| 2018/0208019 A1 | 7/2018 | Sugimura et al. |

FOREIGN PATENT DOCUMENTS

| CN | 105324259 A | * | 2/2016 |
| CN | 108556590 A | | 9/2018 |
| DE | 112012002441 T5 | | 4/2014 |
| DE | 102017201202 A1 | | 7/2018 |

(Continued)

*Primary Examiner* — Davis D Hwu
(74) *Attorney, Agent, or Firm* — Harness, Dickey & Pierce, P.L.C.

(57) ABSTRACT

A vehicular air conditioner includes a refrigeration cycle system, a high-temperature heat medium circuit, and a low-temperature heat medium circuit. The high-temperature heat medium circuit includes an air-heat medium heat exchanger, a heater core, a branching portion, a common passage, a flow rate adjuster, and an auxiliary heat source. The air-heat medium heat exchanger exchanges heat between the heat medium and an outside air. The heater core is arranged parallel to the air-heat medium heat exchanger and causes the heat medium to transfer heat to a ventilation air. The branching portion divides a flow of the heat medium into a flow toward the air-heat medium heat exchanger and a flow toward the heater core. The auxiliary heat source is arranged in the common passage at a position upstream of the branching portion.

11 Claims, 10 Drawing Sheets

(56) References Cited

FOREIGN PATENT DOCUMENTS

| DE | 112017005756 T5 | 8/2019 |
|---|---|---|
| JP | 2017128223 A | 7/2017 |

* cited by examiner

VEHICULAR AIR CONDITIONER

CROSS REFERENCE TO RELATED APPLICATION

The present application is a continuation application of International Patent Application No. PCT/JP2019/044815 filed on Nov. 15, 2019, which designated the U.S. and claims the benefit of priority from Japanese Patent Application No. 2018-244749 filed on Dec. 27, 2018. The entire disclosures of all of the above applications are incorporated herein by reference.

TECHNICAL FIELD

The present disclosure relates to a vehicular air conditioner.

BACKGROUND ART

Heating and defrosting of a radiator by a heater core are realized by switching the inflow and outflow of a coolant between a first hot water circuit including an engine and a second hot water circuit including a heating device, the heater core, a water cooling capacitor, a radiator, and a chiller.

SUMMARY

A vehicular air conditioner includes a refrigeration cycle system, a high-temperature heat medium circuit, and a low-temperature heat medium circuit. The refrigeration cycle system includes a compressor, a heat medium-refrigerant heat exchanger, a decompressor, and a heat absorber.

The compressor is configured to compress and discharge a refrigerant. The heat medium-refrigerant heat exchanger is configured to cause the high-pressure refrigerant discharged from the compressor to release heat to a heat medium. The decompressor is configured to decompress the high-pressure refrigerant flowing out of the heat medium-refrigerant heat exchanger. The heat absorber is configured to cause the low-pressure refrigerant decompressed by the decompressor to absorb heat to evaporate.

The heat medium circulates through the high-temperature heat medium such that the high-pressure refrigerant releases heat to the heat medium in the heat medium-refrigerant heat exchanger. The heat medium circulates through the low-temperature heat medium such that the heat medium is cooled and the low-pressure refrigerant absorbs heat from the heat medium in the heat absorber.

The high-temperature heat medium circuit includes an air-heat medium heat exchanger, a heater core, a branching portion, a common passage, a flow rate adjuster, and an auxiliary heat source.

The air-heat medium heat exchanger is configured to exchange heat between the heat medium and an air outside of a vehicle cabin. The heater core is configured to cause the heat medium to release heat to a ventilation air supplied into an air conditioning target space. The heater core is arranged in parallel to the air-heat medium heat exchanger. A flow of the heat medium is divided at the branching portion into a flow toward the air-heat medium heat exchanger and a flow toward the heater core.

The heat medium having flowed through the air-heat medium heat exchanger and the flow of the heat medium having flowed through the heater core are merged into the common passage. The heat medium-refrigerant heat exchanger is arranged in the common passage. The flow rate adjuster is configured to adjust a flow amount of the heat medium toward the air-heat medium heat exchanger from the branching portion relative to a flow amount of the heat medium toward the heater core from the branching portion. The auxiliary heat source is configured to heat the heat medium and located in the common passage at a position upstream of the branching portion in a flow direction of the heat medium.

BRIEF DESCRIPTION OF DRAWINGS

Above and other objects, features, and advantages of the present disclosure will become more apparent from the following detailed description with reference to the accompanying drawings. In the accompanying drawings.

DESCRIPTION OF EMBODIMENTS

Figure 1:
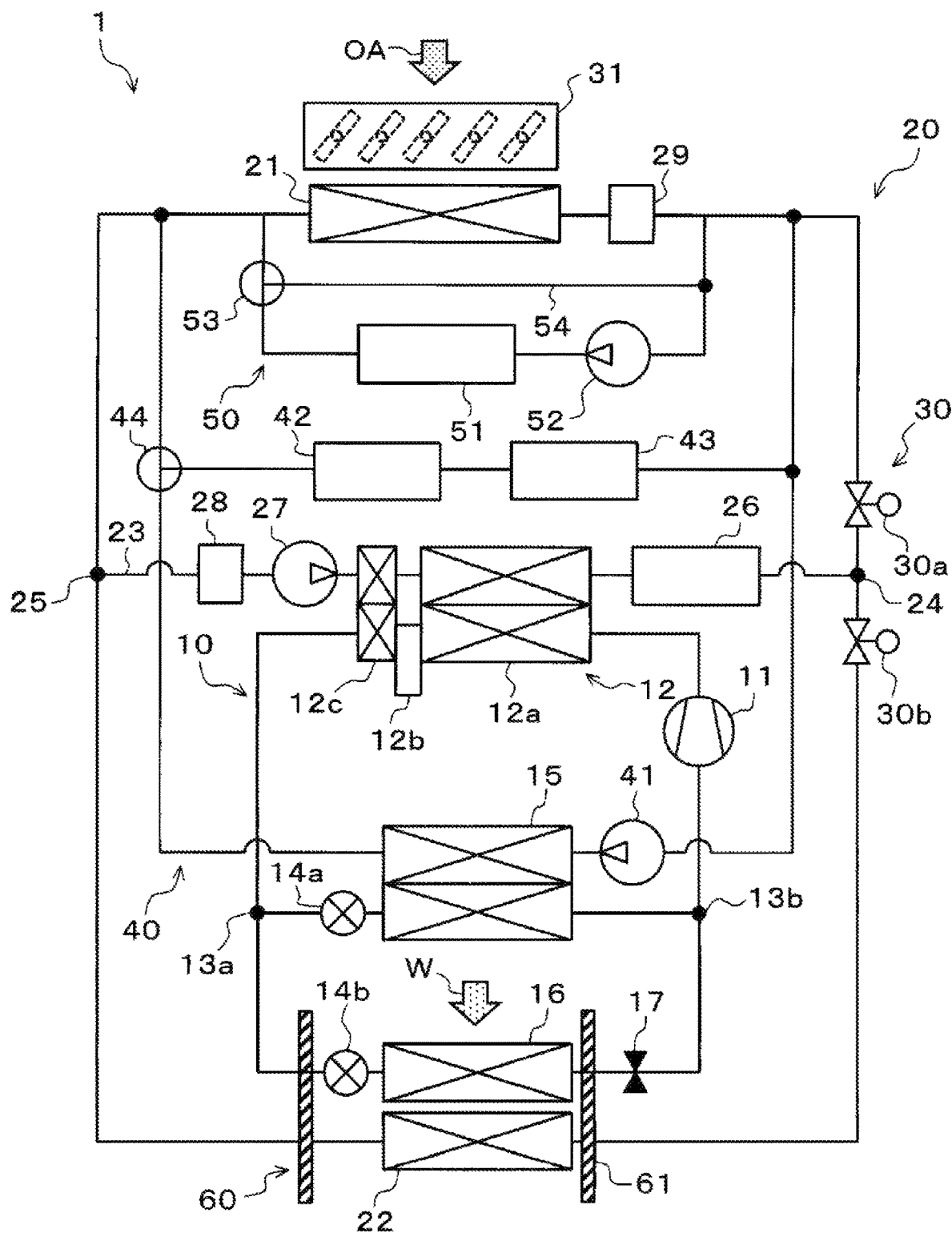
FIG. 1 is an overall configuration diagram of a vehicular air conditioner according to a first embodiment.

To begin with, examples relevant techniques will be described.

In a vehicular air conditioner, a heat exchanger that absorbs heat from outside air may be frosted, and it is known that a heating capacity is lowered by the lowering of a heat exchanging performance caused by frosting.

Heating and defrosting of a radiator by a heater core are realized by switching the inflow and outflow of a coolant between a first hot water circuit including an engine and a second hot water circuit including a heating device, the heater core, a water cooling capacitor, a radiator, and a chiller. When the heat of the first hot water circuit is not sufficient for defrosting, the coolant is heated by the heating device to compensate for an amount of heat required for defrosting the radiator.

However, when the defrosting of the radiator is performed, the cooling water passes through many devices including the heater core between the heating device disposed as an auxiliary heat source and the radiator to be defrosted. The passage of the coolant from the heating device to the radiator is also long. Therefore, the amount of heat added by the heating device is decreased in a process of reaching the radiator which is the device to be defrosted. That is, it is considered that the amount of heat of the heating device cannot be effectively utilized when defrosting the radiator.

When defrosting of the radiator is performed, the passage configuration is such that the coolant cannot reach the radiator unless the coolant passes through the heater core. Therefore, it is difficult to selectively perform the defrosting of the radiator, and the heat of the auxiliary heat source is lost in the heater core when defrosting the radiator.

Various heat sources available for heating and defrosting exist in a vehicle. Depending on characteristics of each heat source, it is considered that efficient use aspects differ from each other as the auxiliary heat source for heating and defrosting.

The present disclosure is made in view of these points, and an object thereof is to provide a vehicular air conditioner capable of efficiently utilizing heat generated by an auxiliary heat source when heating or defrosting of a vehicle cabin is performed.

According to one aspect of the present disclosure, a vehicular air conditioner includes a refrigeration cycle system, a high-temperature heat medium circuit, and a low-temperature heat medium circuit. The refrigeration cycle system includes a compressor, a heat medium-refrigerant heat exchanger, a decompressor, and a heat absorber.

The compressor is configured to compress and discharge a refrigerant. The heat medium-refrigerant heat exchanger is configured to cause the high-pressure refrigerant discharged from the compressor to release heat to a heat medium. The decompressor is configured to decompress the high-pressure refrigerant flowing out of the heat medium-refrigerant heat exchanger. The heat absorber is configured to cause the low-pressure refrigerant decompressed by the decompressor to absorb heat to evaporate.

The heat medium circulates through the high-temperature heat medium such that the high-pressure refrigerant releases heat to the heat medium in the heat medium-refrigerant heat exchanger. The heat medium circulates through the low-temperature heat medium such that the heat medium is cooled and the low-pressure refrigerant absorbs heat from the heat medium in the heat absorber.

The high-temperature heat medium circuit includes an air-heat medium heat exchanger, a heater core, a branching portion, a common passage, a flow rate adjuster, and an auxiliary heat source.

The air-heat medium heat exchanger is configured to exchange heat between the heat medium and an air outside of a vehicle cabin. The heater core is configured to cause the heat medium to release heat to a ventilation air supplied into an air conditioning target space. The heater core is arranged in parallel to the air-heat medium heat exchanger. A flow of the heat medium is divided at the branching portion into a flow toward the air-heat medium heat exchanger and a flow toward the heater core.

The heat medium having flowed through the air-heat medium heat exchanger and the flow of the heat medium having flowed through the heater core are merged into the common passage. The heat medium-refrigerant heat exchanger is arranged in the common passage. The flow rate adjuster is configured to adjust a flow amount of the heat medium toward the air-heat medium heat exchanger from the branching portion relative to a flow amount of the heat medium toward the heater core from the branching portion. The auxiliary heat source is configured to heat the heat medium and located in the common passage at a position upstream of the branching portion in a flow direction of the heat medium.

According to this, by adjusting the flow rate of the heat medium toward the air-heat medium heat exchanger and the flow rate of the heat medium toward the heater core in the flow rate adjuster, defrosting of the air-heat medium heat exchanger and heating of the air conditioning target by the heater core is capable of be realized by using the heat of the auxiliary heat source.

In order to heat the heat medium on the upstream side of the branching portion with respect to the flow direction of the heat medium in the common passage, the auxiliary heat source is capable of be moved with respect to both the air-heat medium heat exchanger and the heater core while maintaining the heat by the auxiliary heat source as much as possible. That is, the vehicular air conditioner is capable of efficiently utilizing the heat of the auxiliary heat source when defrosting the air-heat medium heat exchanger and heating by the heater core.

Hereinafter, multiple aspects for performing the present disclosure will be described with reference to the drawings. In each embodiment, portions corresponding to those described in the preceding embodiment are denoted by the same reference numerals, and overlapping descriptions may be omitted. When only a part of a configuration is described in each embodiment, the other embodiments described above is capable of be applied for the other parts of the configuration. Not only a combination of parts that clearly indicate that the combination is possible in each embodiment, but also a partial combination of embodiments even if the combination is not specified is also possible when there is no problem in the combination.

First Embodiment

First, a first embodiment of the present disclosure will be described with reference to FIGS. 1 to 3. In the first embodiment, a vehicular air conditioner 1 according to the present disclosure is applied to an electric vehicle in which a vehicle travel driving force is obtained from a traveling electric motor. The vehicular air conditioner 1 performs air-conditioning of a vehicle cabin, which is a space to be air conditioned, and temperature adjustment of a device including a battery 42 or the like in the electric vehicle.

The vehicular air conditioner 1 is capable of switching between a cooling mode, a heating mode, and a defrosting mode as driving modes for performing air-conditioning of the vehicle cabin. The cooling mode is a driving mode in which ventilation air blown into the vehicle cabin is cooled and blown into the vehicle cabin. The heating mode is a driving mode in which the ventilation air is heated and blown into the vehicle cabin. The defrosting mode is a driving mode in which frost of a radiator 21 is removed when the radiator 21 is frosted.

In a refrigeration cycle system 10 of the vehicular air conditioner 1, an HFC-based refrigerant (specifically, R134a) is employed as a refrigerant, and a subcritical refrigeration cycle system is configured in which a high-pressure side refrigerant pressure does not exceed a critical pressure of the refrigerant. The refrigerant is mixed with a refrigerator oil for lubricating a compressor 11. As the refrigerator oil, polyalkylene glycol oil (PAG oil) having compatibility with a liquid-phase refrigerant is employed. Some of the refrigerator oil circulates a cycle together with the refrigerant.

Next, a specific configuration of the vehicular air conditioner 1 according to the first embodiment will be described with reference to FIG. 1. The vehicular air conditioner 1 includes a refrigeration cycle system 10, a high-temperature side cooling water circuit 20, a low-temperature side cooling water circuit 40, a device cooling water circuit 50, an interior air conditioning unit 60, and a control device 70.

First, each configuration device of the refrigeration cycle system 10 in the vehicular air conditioner 1 will be described. The refrigeration cycle system 10 is a vapor compression type refrigeration cycle system device.

In the refrigeration cycle system 10, the compressor 11 sucks, compresses, and discharges the refrigerant. The compressor 11 is disposed in a vehicle engine hood. The compressor 11 is an electric compressor that rotationally drives a fixed capacity type compression mechanism having a fixed discharge capacity, by an electric motor. The number of revolutions (that is, a refrigerant discharge capacity) of the compressor 11 is controlled by a control signal output from the control device 70 which is described later.

An inlet side of a refrigerant passage of a water-refrigerant heat exchanger 12 is connected to a discharge port of the compressor 11. The water-refrigerant heat exchanger 12 is a heat exchanger configured to cause a high-pressure refrigerant discharged from the compressor 11 to release heat to cooling water, which is a heat medium circulating through the high-temperature side cooling water circuit 20, thereby heating the cooling water.

The water-refrigerant heat exchanger 12 is configured of a so-called subcooling condenser, and includes a condensing portion 12a, a receiver portion 12b, and a subcooling unit 12c. The condensing portion 12a is a heat exchanging unit that condenses the refrigerant by exchanging heat between the high-pressure refrigerant and the cooling water of the high-temperature side cooling water circuit 20. The receiver portion 12b is a liquid receiving portion that stores the liquid-phase refrigerant flowing out of the condensing portion 12a. The subcooling unit 12c is a heat exchanging unit that subcools the liquid-phase refrigerant by exchanging heat between the liquid-phase refrigerant flowing out of the receiver portion 12b and the cooling water of the high-temperature side cooling water circuit 20.

Therefore, a so-called receiver cycle is capable of be configured, and the high-pressure liquid-phase refrigerant condensed in the condensing portion 12a is capable of be stored in the receiver portion 12b as an excess refrigerant of the cycle. Therefore, the refrigerant flowing out of an interior evaporator 16 is capable of be evaporated to a gas-phase refrigerant having a degree of superheat. By subcooling the refrigerant in the subcooling unit 12c, an enthalpy difference between an enthalpy of an outlet side refrigerant of the interior evaporator 16 and an enthalpy of an inlet side refrigerant is capable of be enlarged.

The water-refrigerant heat exchanger 12 corresponds to a heat medium-refrigerant heat exchanger. As the cooling water in the high-temperature side cooling water circuit 20, a solution containing ethylene glycol, an antifreeze, or the like is capable of be employed.

The refrigerant inflow port side of the refrigerant branching portion 13a is connected to an outlet of the refrigerant passage of the water-refrigerant heat exchanger 12. The refrigerant branching portion 13a branches the flow of the liquid-phase refrigerant flowing out of the water-refrigerant heat exchanger 12. The refrigerant branching portion 13a is provided to have a three way joint structure having three refrigerant inflow and outflow ports communicating with each other. In the refrigerant branching portion 13a, one of the three inflow and outflow ports is a refrigerant inflow port, and the other two are refrigerant outflow ports.

The refrigerant inlet side of a chiller 15 is connected to one refrigerant outflow port of the refrigerant branching portion 13a via a first expansion valve 14a. The refrigerant inlet side of the interior evaporator 16 is connected to the other refrigerant outflow port of the refrigerant branching portion 13a via a second expansion valve 14b.

The first expansion valve 14a is a decompressor that reduces the pressure of the refrigerant that has flowed from one refrigerant outflow port of the refrigerant branching portion 13a at least in the heating mode. The first expansion valve 14a is an electric variable throttle mechanism and includes a valve body and an electric actuator. That is, the first expansion valve 14a includes a so-called electric expansion valve.

The valve body of the first expansion valve 14a is configured to be capable of changing a passage opening degree (in other words, a throttle opening degree) of the refrigerant passage. The electric actuator has a stepping motor for changing the throttle opening degree of the valve body. An operation of the first expansion valve 14a is controlled by a control signal output from the control device 70.

The first expansion valve 14a includes a variable throttle mechanism having a full opening function of fully opening the refrigerant passage when the throttle opening degree is fully opened and a full closing function of fully closing the refrigerant passage when the throttle opening degree is fully closed. That is, the first expansion valve 14a is capable of prevent the refrigerant from exhibiting a pressure reducing action by fully opening the refrigerant passage.

The first expansion valve 14a is capable of block the inflow of the refrigerant to the chiller 15 by closing the refrigerant passage. That is, the first expansion valve 14a has both a function as the decompressor for reducing the pressure of the refrigerant and a function as a refrigerant circuit switching unit for switching the refrigerant circuit.

The refrigerant inlet side of the chiller 15 is connected to the outlet of the first expansion valve 14a. The chiller 15 is a heat exchanger for exchanging heat between a low-pressure refrigerant whose pressure is reduced by the first expansion valve 14a and the cooling water circulating through the low-temperature side cooling water circuit 40.

The chiller 15 has a refrigerant passage for flowing the low-pressure refrigerant whose pressure is reduced by the first expansion valve 14a and a water passage for allowing the cooling water circulating in the low-temperature side cooling water circuit 40 to flow. Therefore, the chiller 15 is a heat absorber that evaporates the low-pressure refrigerant and absorbs heat from the cooling water by heat exchange between the low-pressure refrigerant flowing through the refrigerant passage and the cooling water flowing through the water passage.

As illustrated in FIG. 1, the second expansion valve 14b is connected to the other refrigerant outflow port in the refrigerant branching portion 13a. The second expansion valve 14b is a decompressor that reduces the pressure of the refrigerant that has flowed from the other refrigerant outflow port of the refrigerant branching portion 13a at least in the cooling mode.

Like the first expansion valve 14a, the second expansion valve 14b is an electric variable throttle mechanism and includes a valve body and an electric actuator. That is, the second expansion valve 14b includes a so-called electric expansion valve, and has a full opening function and a full closing function.

That is, the second expansion valve 14b is capable of prevent the refrigerant from exhibiting a pressure reducing action by fully opening the refrigerant passage. The second expansion valve 14b is capable of block the inflow of the refrigerant to the interior evaporator 16 by closing the refrigerant passage. That is, the second expansion valve 14b has both a function as the decompressor for reducing the pressure of the refrigerant and a function as a refrigerant circuit switching unit for switching the refrigerant circuit.

The refrigerant inlet side of the interior evaporator 16 is connected to the outlet of the second expansion valve 14b. The interior evaporator 16 is an evaporator that evaporates the low-pressure refrigerant and cools the ventilation air W at least in the cooling mode by exchanging heat between the low-pressure refrigerant whose pressure is reduced by the second expansion valve 14b. As illustrated in FIGS. 1 and 2, the interior evaporator 16 is disposed in a casing 61 of the interior air conditioning unit 60.

An inlet side of an evaporation pressure regulation valve 17 is connected to a refrigerant outlet of the interior evaporator 16. The evaporation pressure regulation valve 17 is an evaporation pressure adjustment unit that maintains the refrigerant evaporating pressure in the interior evaporator 16 at a predetermined reference pressure or higher. The evaporation pressure regulation valve 17 includes a mechanical variable throttle mechanism that increases the valve opening degree as the refrigerant pressure on the outlet side of the interior evaporator 16 increases.

The evaporation pressure regulation valve 17 is configured to maintain the refrigerant evaporation temperature in the interior evaporator 16 at a reference temperature (1° C. in the present embodiment) or higher at which frosting of the interior evaporator 16 is capable of be restricted.

As illustrated in FIG. 1, one refrigerant inlet side of a refrigerant merging portion 13b is connected to the refrigerant outlet side of the chiller 15. The other refrigerant inlet side of the refrigerant merging portion 13b is connected to the outlet of the evaporation pressure regulation valve 17.

The refrigerant merging portion 13b has a three way joint structure similar to that of the refrigerant branching portion 13a, and two of three inflow and outflow ports are used as refrigerant inlets and the remaining one is used as a refrigerant outlet. The refrigerant merging portion 13b merges the flow of the refrigerant that has flowed from the evaporation pressure regulation valve 17 and the flow of the refrigerant that has flowed out from the chiller 15. The intake port side of the compressor 11 is connected to the refrigerant outlet of the refrigerant merging portion 13b.

Next, the high-temperature side cooling water circuit 20 in the vehicular air conditioner 1 will be described. The high-temperature side cooling water circuit 20 is a high-temperature heat medium circuit that circulates the cooling water as the heat medium. As the cooling water in the high-temperature side cooling water circuit 20, a solution containing ethylene glycol, an antifreeze, or the like is capable of be employed.

In the high-temperature side cooling water circuit 20, a water passage of the water-refrigerant heat exchanger 12, the radiator 21, a heater core 22, an electric heater 26, a high-temperature side pump 27, a first reserve tank 28, a second reserve tank 29, a flow rate adjuster 30, and the like are disposed.

The radiator 21 is a heat exchanger that exchanges heat between the cooling water heated by the water-refrigerant heat exchanger 12 or the like and an outside air OA blown from an outside air fan (not illustrated), and radiates heat of the cooling water to the outside air OA. The radiator 21 is an example of an air-heat medium heat exchanger.

The radiator 21 is disposed on a front side in the vehicle engine hood. Along with the above-described operation of the outside air fan, the outside air OA flows from the vehicle front side to the rear side, and passes through the heat exchanging unit of the radiator 21. When the vehicle is traveling, traveling wind is capable of be applied to the radiator 21 from the vehicle front side toward the rear.

The heater core 22 is a heat exchanger that heats the ventilation air W by exchanging heat between the cooling water heated by the water-refrigerant heat exchanger 12 or the like and the ventilation air W that has passed through the interior evaporator 16. As illustrated in FIGS. 1 and 2, the heater core 22 is disposed in the casing 61 of the interior air conditioning unit 60.

As illustrated in FIG. 1, in the high-temperature side cooling water circuit 20, the radiator 21 and the heater core 22 are connected in parallel with respect to the flow of the cooling water in the high-temperature side cooling water circuit 20. That is, the high-temperature side cooling water circuit 20 has a common passage 23 through which both the cooling water circulating through the radiator 21 and the cooling water circulating through the heater core 22 commonly flow.

The common passage 23 includes a water passage of the water-refrigerant heat exchanger 12. A branching portion 24 is disposed on one end side of the common passage 23. The branching portion 24 is provided to have a three way joint structure having three inflow and outflow ports communicating with each other. In the branching portion 24, one of the three inflow and outflow ports is used as an inflow port, and the other two are used as outflow ports.

One end portion of the common passage 23 is connected to the inlet side of the cooling water in the branching portion 24. An inlet side of the radiator 21 is connected to one outlet side in the branching portion 24 via a first electromagnetic valve 30a and the second reserve tank 29.

The inlet side of the heater core 22 is connected to the other outlet side in the branching portion 24 via a second electromagnetic valve 30b. That is, the flow of the cooling water is divided by the branching portion 24 into a flow toward the radiator 21 and a flow toward the heater core 22 at the end portion of the common passage 23.

A merging portion 25 is disposed on the other end portion side of the common passage 23. The merging portion 25 is configured to have a three way joint structure similar to that of the branching portion 24, and one of the three inflow and outflow ports is used as an outflow port, and the other two are used as inflow ports.

An outlet side of the radiator 21 is connected to one inlet side in the merging portion 25. The outlet side in the heater core 22 is connected to the other inlet side in the merging portion 25. The other end portion of the common passage 23 is connected to the outlet side in the merging portion 25.

Therefore, in the high-temperature side cooling water circuit 20, the common passage 23 is arranged such that the flow of the cooling water having flowed out of the radiator 21 and the flow of the cooling water having flowed out of the heater core 22 are merged into the common passage 23. In the common passage 23, the merging portion 25 is located on a most upstream side of the flow of the cooling water. The branching portion 24 is located on a most downstream side of the flow of the cooling water in the common passage 23.

As illustrated in FIG. 1, in addition to the water-refrigerant heat exchanger 12, the electric heater 26, the high-temperature side pump 27, and the first reserve tank 28 are disposed in the common passage 23. The electric heater 26 is a heating device that generates heat by being supplied with electric power and heats the cooling water flowing through the common passage 23. As the electric heater 26, for example, a PTC heater having a PTC element (that is, a positive characteristic thermistor) is capable of be used. The electric heater 26 is capable of arbitrarily adjust the amount of heat for heating the cooling water by a control voltage output from the control device 70. The electric heater 26 is an example of an auxiliary heat source.

The electric heater 26 is disposed on the upstream side of the branching portion 24 with respect to the flow of the cooling water in the common passage 23. Specifically, the inlet of the water passage in the electric heater 26 is connected to the outlet side of the water passage in the water-refrigerant heat exchanger 12. The outlet side of the water passage in the electric heater 26 is connected to the inlet side of the branching portion 24. That is, the electric heater 26 is disposed between the water-refrigerant heat exchanger 12 and the branching portion 24 in the common passage 23.

The high-temperature side pump 27 is a water pump that pumps the cooling water in the high-temperature side cooling water circuit 20 to circulate. The high-temperature side pump 27 is an electric pump of which the number of revolutions (that is, pumping capacity) is controlled by a control voltage output from the control device 70. The high-temperature side pump 27 corresponds to a heat medium pump.

As illustrated in FIG. 1, the suction port of the high-temperature side pump 27 is connected to the outlet side of the merging portion 25 via the first reserve tank 28. The discharge port of the high-temperature side pump 27 is connected to the inlet side of the water passage in the water-refrigerant heat exchanger 12. Accordingly, the high-temperature side pump 27 is disposed on the upstream side of the water-refrigerant heat exchanger 12 with respect to the flow of the cooling water in the common passage 23.

The first reserve tank 28 is a cooling water reservoir for storing excess cooling water. By storing the excess cooling water in the first reserve tank 28, it is possible to restrict a decrease in the liquid amount of the cooling water circulating in the cooling water circuit. The first reserve tank 28 functions as a cooling water supply port for supplying the cooling water when the amount of the cooling water in the cooling water circuit is insufficient.

As described above, in the common passage 23 of the high-temperature side cooling water circuit 20, the merging portion 25, the first reserve tank 28, the high-temperature side pump 27, the water-refrigerant heat exchanger 12, the electric heater 26, and the branching portion 24 are disposed in this order in accordance with the flow of the cooling water.

The second reserve tank 29 is a cooling water reservoir for storing excess cooling water, and is disposed on the inlet side of the radiator 21. The second reserve tank 29 also functions as a cooling water supply port for supplying the cooling water when the amount of cooling water in the cooling water circuit is insufficient.

As illustrated in FIG. 1, the high-temperature side cooling water circuit 20 has the flow rate adjuster 30 configured to adjust a flow amount of the heat medium toward the radiator 21 from the branching portion 24 relative to a flow amount of the heat medium toward the heater core 22 from the branching portion 24. Specifically, the flow rate adjuster 30 includes the first electromagnetic valve 30a and the second electromagnetic valve 30b.

The first electromagnetic valve 30a is an electromagnetic valve configured to be capable of adjusting the opening degree of the cooling water passage, and is connected to one outlet in the branching portion 24. The first electromagnetic valve 30a has a full closing function and a full opening function.

Similar to the first electromagnetic valve 30a, the second electromagnetic valve 30b is an electromagnetic valve configured to be capable of adjusting the opening degree of the cooling water passage, and is disposed at the other outlet of the branching portion 24. The second electromagnetic valve 30b has a full closing function and a full closing function.

Therefore, when the second electromagnetic valve 30b is fully closed, the flow rate adjuster 30 is capable of allowing the cooling water that has passed through the branching portion 24 to flow into the radiator 21. When the first electromagnetic valve 30a is fully closed, the flow rate adjuster 30 is capable of allowing the cooling water that has passed through the branching portion 24 to flow into the heater core 22.

In the vehicular air conditioner 1, a shutter device 31 is disposed on the front side of the radiator 21. The shutter device 31 is configured to rotatably dispose multiple blades in an opening portion of a frame-shaped frame. Multiple blades rotate in conjunction with an operation of an electric actuator which is not illustrated to adjust an opening area in the opening portion of the frame. Therefore, the shutter device 31 is capable of adjusting the flow rate of the outside air OA passing through the heat exchanging unit of the radiator 21, so that the heat exchange capability of the radiator 21 is capable of be adjusted.

In the high-temperature side cooling water circuit 20 configured as described above, the flow of the cooling water is capable of being switched by the control of the flow rate adjuster 30. When the second electromagnetic valve 30b of the flow rate adjuster 30 is fully closed, the cooling water circulates in the order of the merging portion 25, the first reserve tank 28, the high-temperature side pump 27, the water-refrigerant heat exchanger 12, the electric heater 26, the first electromagnetic valve 30a, the second reserve tank 29, the radiator 21, and the merging portion 25. In this case, the heat of the cooling water of the high-temperature side cooling water circuit 20 is capable of being radiated to the outside air OA, and the frosted radiator 21 is capable of being defrosted by the heat of the cooling water.

On the other hand, when the first electromagnetic valve 30a of the flow rate adjuster 30 is fully closed, the cooling water circulates in the order of the merging portion 25, the first reserve tank 28, the high-temperature side pump 27, the water-refrigerant heat exchanger 12, the electric heater 26, the second electromagnetic valve 30b, the heater core 22, and the merging portion 25. In this case, the ventilation air W is capable of being heated by the heater core 22 using the heat of the cooling water of the high-temperature side cooling water circuit 20, and the heating of the vehicle cabin is capable of being realized.

Next, the low-temperature side cooling water circuit 40 in the vehicular air conditioner 1 will be described. The low-temperature side cooling water circuit 40 is a low-temperature heat medium circuit that circulates the cooling water which is a heat medium. As the cooling water of the low-temperature side cooling water circuit 40, the same fluid as that of the high-temperature side cooling water circuit 20 is capable of being employed.

In the low-temperature side cooling water circuit 40, a water passage of the chiller 15, a low-temperature side pump 41, a battery 42, a charger 43, a low-temperature side three-way valve 44, and the like are disposed. A discharge port side of the low-temperature side pump 41 is connected to an inlet of the water passage in the chiller 15. The low-temperature side pump 41 is a water pump for pumping the cooling water of the low-temperature side cooling water circuit 40 to the inlet side of the water passage of the chiller 15. A basic configuration of the low-temperature side pump 41 is the same as that of the high-temperature side pump 27.

One of the inflow and outflow ports of the low-temperature side three-way valve 44 is connected to the outlet of the water passage in the chiller 15. The low-temperature side three-way valve 44 is constituted by an electric three way flow rate regulation valve having three inflow and outflow ports.

The inlet side of the water passage in the battery 42 is connected to the other inflow and outflow ports of the low-temperature side three-way valve 44. The battery 42 supplies electric power to various electric devices of the vehicle, and, for example, a secondary battery (in the present embodiment, a lithium ion battery) capable of charging and discharging is employed. By passing the cooling water through the water passage of the battery 42, the temperature of the battery 42 is capable of being adjusted to maintain the temperature of the battery 42 within a predetermined temperature range.

The outlet side of the water passage in the charger 43 is connected to the outlet side of the water passage of the battery 42. The charger 43 is a charger for charging electric power to the battery 42. Since the charger 43 generates heat when the battery 42 is charged, the charger 43 is capable of being cooled by the cooling water of the low-temperature side cooling water circuit 40.

The outlet side of the water passage in the charger 43 is connected to the suction port of the low-temperature side pump 41. Therefore, the low-temperature side cooling water circuit 40 is capable of circulating the cooling water by the low-temperature side pump 41.

As illustrated in FIG. 1, other inflow and outflow ports of the low-temperature side three-way valve 44 are connected to a cooling water pipe which connects the outlet of the radiator 21 and the merging portion 25. The outlet of the water passage in the charger 43 is connected to the cooling water pipe which connects the outlet of the first electromagnetic valve 30a and the inlet of the second reserve tank 29. That is, in the low-temperature side cooling water circuit 40 according to the first embodiment, the battery 42 and the charger 43, and the radiator 21 and the second reserve tank 29 are connected in parallel.

Therefore, the low-temperature side cooling water circuit 40 is capable of switching the flow of the cooling water in the low-temperature side cooling water circuit 40 by controlling the operation of the low-temperature side three-way valve 44. For example, the low-temperature side three-way valve 44 is capable of allowing the inflow and outflow port on the chiller 15 side to communicate with the inflow and outflow ports on the battery 42 side, and is capable of closing the remaining inflow and outflow ports.

In this case, the cooling water in the low-temperature side cooling water circuit 40 flows through in the order of the low-temperature side pump 41, the chiller 15, the low-temperature side three-way valve 44, the battery 42, the charger 43, and the low-temperature side pump 41 to circulate in the low-temperature side cooling water circuit 40. According to the aspect, since the cooling water cooled by the chiller 15 is capable of being supplied to the battery 42 and the charger 43, the battery 42 and the charger 43 is capable of being cooled.

The low-temperature side three-way valve 44 is capable of allowing the three inflow and outflow ports to communicate with each other. According to the aspect, the cooling water in the low-temperature side cooling water circuit 40 flows through in the order of the low-temperature side pump 41, the chiller 15, and the low-temperature side three-way valve 44, and branches and flows by the low-temperature side three-way valve 44. One of the flows of the cooling water flows through in the order of the low-temperature side three-way valve 44, the battery 42, and the charger 43, and the other flows through in the order of the low-temperature side three-way valve 44, the radiator 21, and the second reserve tank 29.

The cooling water flowing out of the charger 43 and the cooling water flowing out of the second reserve tank 29 are merged and reach the suction port of the low-temperature side pump 41. In this case, the low-temperature side cooling water circuit 40 is capable of realizing the cooling of the battery 42 and the charger 43, and the heat exchange with the outside air OA in the radiator 21, in parallel.

The vehicular air conditioner 1 is capable of cooling and adjusting the temperature of the battery 42 and the charger 43 by using the low-temperature side cooling water circuit 40. The vehicular air conditioner 1 is capable of using the outside air OA as a heat source or is capable of radiating heat to the outside air OA by using the radiator 21.

Next, the device cooling water circuit 50 in the vehicular air conditioner 1 will be described. The device cooling water circuit 50 is a heat medium circuit for circulating the cooling water which is a heat medium. As the cooling water of the device cooling water circuit 50, the same fluid as that of the above-described high-temperature side cooling water circuit 20 and the like is capable of being employed.

In the device cooling water circuit 50, a water passage of a vehicle-mounted device 51, a device pump 52, a device three-way valve 53, and the like are disposed. The vehicle-mounted device 51 is mounted on an electric vehicle and includes a device that generates heat during operation. The vehicle-mounted device 51 includes, for example, an inverter, a motor generator, a transaxle device, and the like.

The inverter is a power conversion unit that converts a direct current into an alternating current. The motor generator outputs a traveling driving force by supplying electric power, and generates regenerative electric power at a time of deceleration or the like. The transaxle device is a device that integrates a transmission, and a final gear and differential gear (diff gear). The water passage in the vehicle-mounted device 51 is provided so as to cool each device by allowing the cooling water to flow as a heat medium.

A discharge port of a device pump 52 is connected to an inlet side of a water passage in the vehicle-mounted device 51. The device pump 52 is a water pump for pumping the cooling water of the device cooling water circuit 50 to the inlet side of the water passage of the vehicle-mounted device 51. A basic configuration of the device pump 52 is the same as that of the high-temperature side pump 27 or the like.

As illustrated in FIG. 1, the suction port of the device pump 52 is connected to the cooling water pipe which connects the outlet of the first electromagnetic valve 30a and the inlet of the second reserve tank 29. More specifically, a cooling water pipe extending from the device pump 52 is connected between a connection portion with the cooling water pipe extending from the suction port of the low-temperature side pump 41 and the inlet of the second reserve tank 29.

One of the inflow and outflow ports of the device three-way valve 53 is connected to the outlet side of the water passage in the vehicle-mounted device 51. The device three-way valve 53 includes an electric three way flow rate regulation valve having three inflow and outflow ports.

Other inflow and outflow ports in the device three-way valve 53 are connected to the cooling water pipe which connects the outlet of the radiator 21 and the merging portion 25. More specifically, the cooling water pipe extending from the device three-way valve 53 is connected between the outlet of the radiator 21 and the connection portion with the cooling water pipe which extends from the low-temperature side three-way valve 44.

Therefore, according to the device cooling water circuit 50, the cooling water that has passed through the vehicle-mounted device 51 is capable of being supplied to the radiator 21, and the heat absorbed from the vehicle-mounted device 51 by the cooling water is capable of also being radiated to the outside air OA.

A bypass passage 54 is connected to still other inflow and outflow ports of the device three-way valve 53. The bypass passage 54 is a cooling water passage for bypassing the radiator 21 and the second reserve tank 29 with respect to the flow of the cooling water. The other end side of the bypass passage 54 is connected to the suction port side of the device pump 52.

Therefore, the device cooling water circuit 50 is capable of switching the flow of the cooling water in the device cooling water circuit 50 by controlling the operation of the device three-way valve 53. For example, the device three-way valve 53 is capable of allowing the inflow and outflow ports on the vehicle-mounted device 51 side to communicate with the inflow and outflow ports on the bypass passage 54 side and closing the remaining inflow and outflow ports. In this case, the cooling water of the device cooling water circuit 50 flows and circulates in the order of the device pump 52, the vehicle-mounted device 51, the device three-way valve 53, the bypass passage 54, and the device pump 52.

The device three-way valve 53 is capable of closing the inflow and outflow ports on the bypass passage 54 side to allow the remaining two inflow and outflow ports to communicate with each other. In this case, the cooling water of the device cooling water circuit 50 flows and circulates in the order of the device pump 52, the vehicle-mounted device 51, the device three-way valve 53, the radiator 21, the second reserve tank 29, and the device pump 52.

According to the aspect, since the cooling water absorbed heat from the vehicle-mounted device 51 is capable of being supplied to the radiator 21, the heat generated in the vehicle-mounted device 51 is capable of being radiated to the outside air OA. That is, the vehicular air conditioner 1 is capable of performing cooling and the temperature adjustment of the vehicle-mounted device 51 by using the device cooling water circuit 50.

Next, the interior air conditioning unit 60 constituting the vehicular air conditioner 1 will be described with reference to FIG. 2. In the vehicular air conditioner 1, the interior air conditioning unit 60 is a unit for blowing out the ventilation air W of which the temperature is adjusted by the refrigeration cycle system 10 to an appropriate place in the vehicle cabin. The interior air conditioning unit 60 is disposed inside an instrument panel at a foremost portion of the vehicle cabin.

The interior air conditioning unit 60 is configured by accommodating the blower 62, the interior evaporator 16, the heater core 22, and the like in an air passage formed inside the casing 61 which forms an outer shell thereof. The casing 61 forms the air passage for the ventilation air W to be blown into the vehicle cabin. The casing 61 is formed of a resin (specifically, polypropylene) having a certain degree of elasticity and excellent strength.

Figure 2:
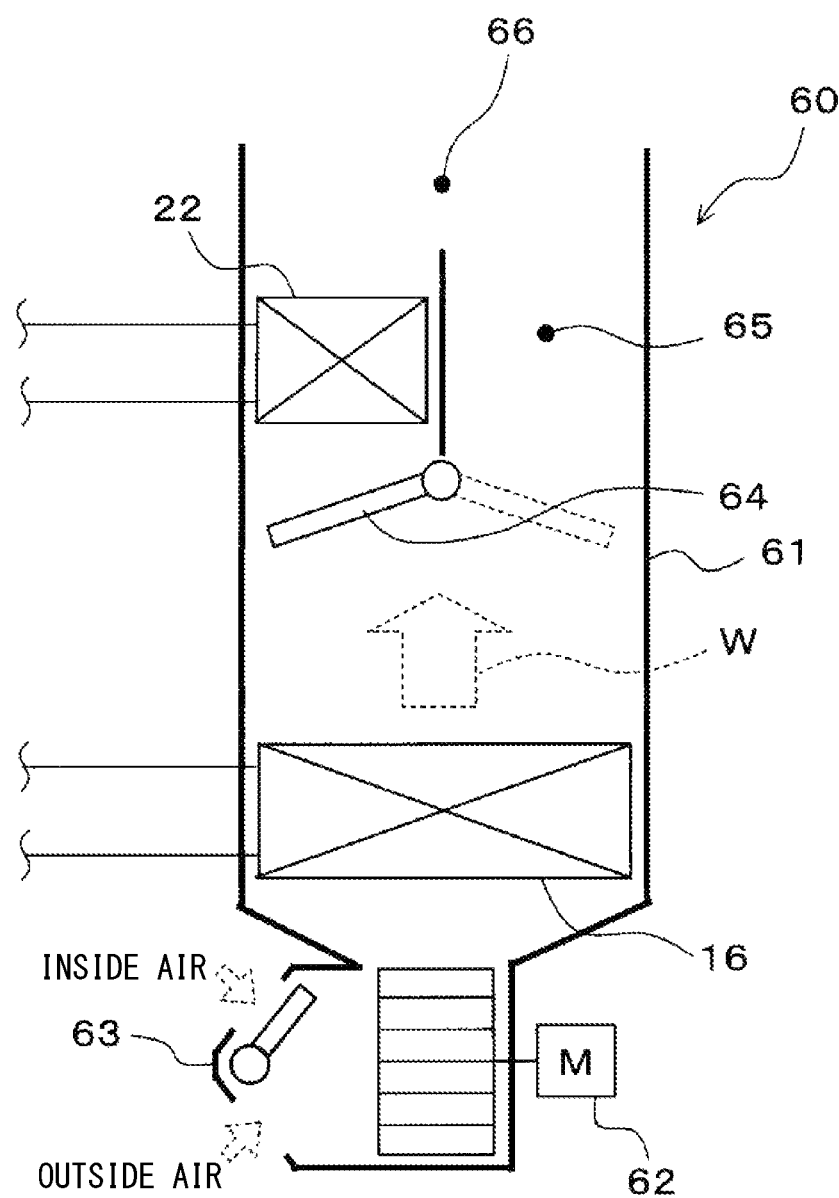
FIG. 2 is an overall configuration diagram of an interior air conditioning unit according to the first embodiment.

As illustrated in FIG. 2, an inside-outside air switch device 63 is disposed on the most upstream side of the ventilation air flow of the casing 61. The inside-outside air switch device 63 switches and introduces inside air (vehicle cabin air) and outside air (vehicle exterior air) into the casing 61.

The inside-outside air switch device 63 continuously adjusts opening areas of an inside air introduction port for introducing the inside air into the casing 61 and an outside air introduction port for introducing the outside air by an inside-outside air switch door, and changes a introducing ratio of an introduction air volume of the inside air and an introduction air volume of the outside air. The inside-outside air switch door is driven by an electric actuator for the inside-outside air switch door. The operation of the electric actuator is controlled by a control signal output from the control device 70.

The blower 62 is disposed on the ventilation air flow downstream side of the inside-outside air switch device 63. The blower 62 includes an electric blower that drives a centrifugal multi-blade fan by an electric motor. The blower 62 blows the air taken in through the inside-outside air switch device 63 toward the vehicle cabin. The number of revolutions (that is, the blowing capacity) of the blower 62 is controlled by a control voltage output from the control device 70.

The interior evaporator 16 and the heater core 22 are disposed on the ventilation air flow downstream side of the blower 62 in this order with respect to the flow of the ventilation air. That is, the interior evaporator 16 is disposed on the ventilation air flow upstream side of the heater core 22.

A cold air bypass passage 65 is provided in the casing 61. The cold air bypass passage 65 is an air passage for flowing the ventilation air W that has passed through the interior evaporator 16 to the downstream side to bypass the heater core 22.

An air mix door 64 is disposed on the ventilation air flow downstream side of the interior evaporator 16 and on the ventilation air flow upstream side of the heater core 22. The air mix door 64 adjusts an air volume ratio of an air volume of the ventilation air W passing through the heater core 22 an air volume of the ventilation air W passing through the cold air bypass passage 65 of the ventilation air W after passing through the interior evaporator 16.

The air mix door 64 is driven by an air mix door driving electric actuator. An operation of the electric actuator is controlled by a control signal output from the control device 70.

A mixing space 66 is provided on the ventilation air flow downstream side of the heater core 22. In the mixing space 66, the ventilation air W which has been heated by the heater core 22 and the ventilation air W that has passed through the cold air bypass passage 65 and has not been heated by the heater core 22 are mixed.

Opening holes for blowing the ventilation air (air conditioning wind) which has been mixed in the mixing space 66 out into the vehicle cabin are disposed at the most downstream portion of the ventilation air flow of the casing 61. As the opening holes, a face opening hole, a foot opening hole, and a defroster opening hole (all not illustrated) are provided.

The face opening hole is an opening hole for blowing the air conditioning wind out toward the upper body of an occupant in the vehicle cabin. The foot opening hole is an opening hole for blowing the air conditioning wind out toward the foot of the occupant. The defroster opening hole is an opening hole for blowing the air conditioning wind out toward the inner side surface of the vehicle front window glass.

The face opening hole, the foot opening hole, and the defroster opening hole are respectively connected to a face blowing port, a foot blowing port, and a defroster blowing port (all not illustrated) provided in the vehicle cabin via a duct forming each air passage.

Therefore, the air mix door 64 adjusts the air volume ratio between the air volume passing through the heater core 22 and the air volume passing through the cold air bypass passage 65, thereby adjusting the temperature of the air conditioning wind mixed in the mixing space 66. Therefore, the temperature of the ventilation air (air conditioning wind) blown from each blowing port into the vehicle cabin is also adjusted.

A face door, a foot door, and a defroster door (all not illustrated) are disposed on the ventilation air flow upstream side of the face opening hole, the foot opening hole, and the defroster opening hole, respectively. The face door adjusts the opening area of the face opening hole. The foot door adjusts the opening area of the foot opening hole. The defroster door adjusts the opening area of the defroster opening hole.

The face door, the foot door, and the defroster door constitute a blowing mode switching device for switching a blowing port through which the air conditioning wind is blown out. The face door, the foot door, and the defroster door are connected to a blowing port mode door driving electric actuator via a link mechanism or the like, and are rotationally operated in conjunction with each other. The operation of the electric actuator is controlled by a control signal output from the control device 70.

Next, a control system of the vehicular air conditioner 1 according to the first embodiment will be described with reference to FIG. 3. The control device 70 is configured of a well-known microcomputer including a CPU, a ROM, a RAM, and the like, and peripheral circuits thereof.

The control device 70 performs various calculations and processes based on control programs stored in the ROM, and controls operations of various control target devices connected to the output side thereof. The control target device includes the compressor 11, the first expansion valve 14a, the second expansion valve 14b, the electric heater 26, the high-temperature side pump 27, the first electromagnetic valve 30a, the second electromagnetic valve 30b, and the shutter device 31. The control target device further includes the low-temperature side pump 41, the low-temperature side three-way valve 44, the device pump 52, the device three-way valve 53, the blower 62, and the like.

Figure 3:
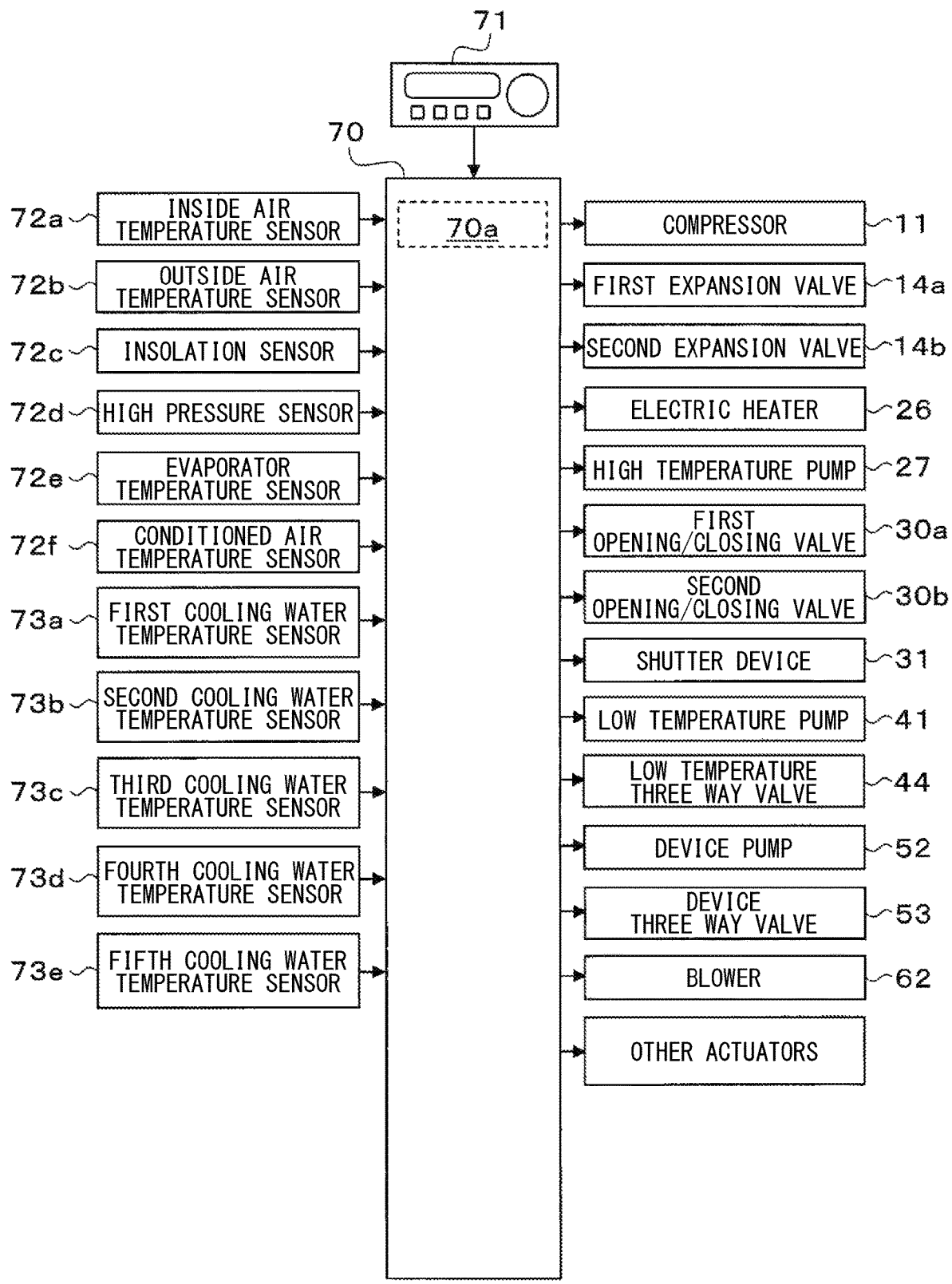
FIG. 3 is a block diagram illustrating a control system of the vehicular air conditioner according to the first embodiment.

As illustrated in FIG. 3, an air conditioning control sensor group is connected to the input side of the control device 70. The air conditioning control sensor group includes an inside air temperature sensor 72a, an outside air temperature sensor 72b, an insolation sensor 72c, a high pressure sensor 72d, an evaporator temperature sensor 72e, and a conditioned air temperature sensor 72f. Detection signals of these air conditioning control sensor groups are input to the control device 70.

The inside air temperature sensor 72a is an inside air temperature detection unit that detects a vehicle cabin temperature (inside air temperature) Tr. The outside air temperature sensor 72b is an outside air temperature detection unit that detects the vehicle exterior air temperature (outside air temperature) Tam. The insolation sensor 72c is an insolation amount detection unit that detects an insolation amount As irradiated into the vehicle cabin. The high pressure sensor 72d is a refrigerant pressure detection unit that detects a high-pressure refrigerant pressure Pd of the refrigerant passage from the discharge port side of the compressor 11 to the inlet side of the first expansion valve 14a or the second expansion valve 14b.

The evaporator temperature sensor 72e is an evaporator temperature detection unit that detects a refrigerant evaporation temperature (evaporator temperature) Tefin in the interior evaporator 16. The conditioned air temperature sensor 72f is an air conditioning wind temperature detection unit that detects a ventilation air temperature TAV blown into the vehicle cabin.

Multiple cooling water temperature sensors are connected to the input side of the control device 70 in order to measure the cooling water temperature in each of the cooling water circuits of the high-temperature side cooling water circuit 20, the low-temperature side cooling water circuit 40, and the device cooling water circuit 50. Multiple cooling water temperature sensors include a first cooling water temperature sensor 73a to a fifth cooling water temperature sensor 73e.

The first cooling water temperature sensor 73a is disposed at the inlet portion of the branching portion 24 to which the common passage 23 is connected, and measures the cooling water temperature flowing out of the common passage 23. The second cooling water temperature sensor 73b is disposed at the inlet portion of the radiator 21, and measures the cooling water temperature passing through the radiator 21. The third cooling water temperature sensor 73c is disposed at the inlet portion of the heater core 22, and measures the cooling water temperature passing through the heater core 22.

The fourth cooling water temperature sensor 73d is disposed at the outlet portion of the water passage in the chiller 15, and measures the cooling water temperature flowing out of the chiller 15. The fifth cooling water temperature sensor 73e is disposed at the outlet portion of the water passage in the vehicle-mounted device 51, and measures the cooling water temperature flowing out of the water passage of the vehicle-mounted device 51.

The vehicular air conditioner 1 refers to detection results of the first cooling water temperature sensor 73a to the fifth cooling water temperature sensor 73e, and switches the flow of the cooling water in the high-temperature side cooling water circuit 20, the low-temperature side cooling water circuit 40, and the device cooling water circuit 50. Therefore, the vehicular air conditioner 1 is capable of managing the heat in the vehicle by using the cooling water that is the heat medium.

An operation panel 71 disposed in the vicinity of the instrument panel in the front portion of the vehicle cabin is connected to the input side of the control device 70. Multiple operation switches are disposed on the operation panel 71. Accordingly, operation signals from multiple operation switches are input to the control device 70. The various operation switches on the operation panel 71 include an automatic switch, a cooling switch, an air volume setting switch, a temperature setting switch, and the like.

The automatic switch is operated when the automatic control operation of the vehicular air conditioner 1 is set or released. The cooling switch is operated when a request is made to cool the vehicle cabin. The air volume setting switch is operated when the air volume of the blower 62 is manually set. The temperature setting switch is operated when a target temperature Tset is set in the vehicle cabin.

In the control device 70, a control unit for controlling various control target devices connected to the output side thereof is integrally configured, and a configuration (hardware and software) for controlling the operation of each control target device constitutes a control unit for controlling the operation of each control target device. For example, of the control device 70, the configuration for controlling the operation of the first electromagnetic valve 30a and the second electromagnetic valve 30b constituting the flow rate adjuster 30 is a flow rate regulation control unit 70a.

The operation of the vehicular air conditioner 1 according to the first embodiment will be described. As described above, in the vehicular air conditioner 1 according to the first embodiment, an appropriate driving mode is capable of being switched from multiple driving modes. The switching of these driving modes is performed by executing a control program stored in advance in the control device 70.

More specifically, in the control program, the target blowing temperature TAO of the ventilation air to be blown into the vehicle cabin is calculated based on a detection signal detected by the air conditioning control sensor group and an operation signal output from the operation panel 71. The driving mode is switched based on the target blowing temperature TAO and the detection signal. In the multiple driving modes, an operation in the cooling mode, an operation in the heating mode, and an operation in the defrosting mode will be described below.

(a) Cooling Mode

The cooling mode is a driving mode in which the ventilation air W is cooled by the interior evaporator 16 and blown into the vehicle cabin. In the following description, as the operating mode of the cooling mode, a case where cooling of the vehicle cabin is performed while performing the cooling of the battery 42 and the like is described.

In the cooling mode in this case, the control device 70 opens the first expansion valve 14a and the second expansion valve 14b at respective predetermined throttle opening degrees. Therefore, in the refrigeration cycle system 10 in the cooling mode, the refrigerant first flows to the compressor 11, the water-refrigerant heat exchanger 12, and the refrigerant branching portion 13a. The refrigerant flows from one side of the refrigerant branching portion 13a to the first expansion valve 14a and the chiller 15, and flows from the other side of the refrigerant branching portion 13a to the second expansion valve 14b, the interior evaporator 16, and the evaporation pressure regulation valve 17. The refrigerant that has flowed from the chiller 15 and the refrigerant that has flowed from the evaporation pressure regulation valve 17 merge in the refrigerant merging portion 13b, and then flow in the order of the compressor 11 to circulate.

That is, in the cooling mode, the refrigerant flows into the chiller 15 to cool the cooling water of the low-temperature side cooling water circuit 40, and the refrigerant flows into the interior evaporator 16 to switch to the refrigerant circuit for cooling the ventilation air W.

In this cycle configuration, the control device 70 controls operations of various control target devices connected to the output side.

For example, the control device 70 controls the operation of the compressor 11 so that a refrigerant evaporation temperature Tefin measured by the evaporator temperature sensor 72e becomes the target evaporation temperature TEO. The target evaporation temperature TEO is determined based on the target blowing temperature TAO with reference to a cooling mode control map stored in advance in the control device 70.

Specifically, in this control map, the target evaporation temperature TEO is increased along with the increase of the target blowing temperature TAO so that the ventilation air temperature TAV measured by the conditioned air temperature sensor 72f approaches the target blowing temperature TAO. The target evaporation temperature TEO is determined to be a value of a range (specifically, 1° C. or more) in which frosting of the interior evaporator 16 is capable of being restricted.

The control device 70 determines a control voltage (blowing capacity) of the blower 62 based on the target blowing temperature TAO with reference to the control map stored in advance in the control device 70. Specifically, in this control map, the blowing air volume of the blower 62 is maximized in a cryogenic range (maximum cooling range) and an extremely high temperature range (maximum heating range) of the target blowing temperature TAO, and the blowing air volume is decreased as the blowing air volume approaches an intermediate temperature range. The control device 70 controls the operation of the air mix door 64 so that the cold air bypass passage 65 is fully opened to close the air flow passage on the heater core 22 side.

With respect to the high-temperature side cooling water circuit 20, the control device 70 controls the operation of the high-temperature side pump 27 so as to exhibit a predetermined water pumping capacity in the cooling mode. The control device 70 controls the flow rate adjuster 30 to make the first electromagnetic valve 30a to a fully opened state and the second electromagnetic valve 30b to a fully closed state.

Therefore, the cooling water of the high-temperature side cooling water circuit 20 circulates in the order of the high-temperature side pump 27, the water-refrigerant heat exchanger 12, the electric heater 26, the branching portion 24, the first electromagnetic valve 30a, the second reserve tank 29, the radiator 21, the merging portion 25, and the high-temperature side pump 27.

With respect to the low-temperature side cooling water circuit 40, the control device 70 controls the operation of the low-temperature side pump 41 so as to exhibit the water pumping capacity in the cooling mode. The control device 70 controls the operation of the low-temperature side three-way valve 44 to allow the inflow and outflow ports on the chiller 15 side to communicate with the inflow and outflow ports on the battery 42 side, and close the remaining inflow and outflow ports.

Therefore, the cooling water in the low-temperature side cooling water circuit 40 circulates in the order of the low-temperature side pump 41, the chiller 15, the low-temperature side three-way valve 44, the battery 42, the charger 43, and the low-temperature side pump 41.

In the device cooling water circuit 50, the control device 70 controls the operation of the device pump 52 so as to exhibit a predetermined water pumping capacity in the cooling mode. The control device 70 controls the operation of the device three-way valve 53 so that the inflow and outflow ports on the vehicle-mounted device 51 side and the inflow and outflow ports on the bypass passage 54 side communicate with each other, and the remaining inflow and outflow ports are closed. Therefore, the cooling water in the device cooling water circuit 50 circulates in the order of the device pump 52, the vehicle-mounted device 51, the device three-way valve 53, the bypass passage 54, and the device pump 52.

As described above, in the refrigeration cycle system 10 of the cooling mode, the high-pressure refrigerant discharged from the compressor 11 flows into the water-refrigerant heat exchanger 12. In the water-refrigerant heat exchanger 12, since the high-temperature side pump 27 operates, the high-pressure refrigerant and the cooling water of the high-temperature side cooling water circuit 20 exchange heat, the high-pressure refrigerant is cooled and condensed, and the cooling water is heated.

In the high-temperature side cooling water circuit 20, the cooling water which has been heated by the water-refrigerant heat exchanger 12 flows into the radiator 21 via the branching portion 24 and the first electromagnetic valve 30*a*. The cooling water flowing into the radiator 21 exchanges heat with the outside air OA to radiate heat. Therefore, the cooling water of the high-temperature side cooling water circuit 20 is cooled. The cooling water which has been cooled by the radiator 21 is sucked into the high-temperature side pump 27 and is pumped to the water passage of the water-refrigerant heat exchanger 12 again.

On the other hand, the high-pressure refrigerant which has been cooled in the refrigerant passage of the water-refrigerant heat exchanger 12 flows into the first expansion valve 14*a* via the refrigerant branching portion 13*a* and is reduced in pressure. The low-pressure refrigerant whose pressure is reduced by the first expansion valve 14*a* flows into the chiller 15, absorbs heat from the cooling water flowing through the water passage of the chiller 15, and evaporates. Therefore, the cooling water of the low-temperature side cooling water circuit 40 is cooled. The low-pressure refrigerant that has flowed out of the chiller 15 is sucked into the compressor 11 via the refrigerant merging portion 13*b* and is reduced in pressure again.

The high-pressure refrigerant flowing out of the other side of the refrigerant branching portion 13*a* flows into the second expansion valve 14*b* and is reduced in pressure. The throttle opening degree of the second expansion valve 14*b* is adjusted so that a degree of superheat of the refrigerant on the outlet side of the interior evaporator 16 becomes approximately 3° C.

The low-pressure refrigerant whose pressure is reduced by the second expansion valve 14*b* flows into the interior evaporator 16. The refrigerant that has flowed into the interior evaporator 16 absorbs heat from the ventilation air W blown from the blower 62 and evaporates to cool the ventilation air W. The refrigerant that has flowed from the interior evaporator 16 is sucked into the compressor 11 via the evaporation pressure regulation valve 17 and the refrigerant merging portion 13*b* and compressed again.

Therefore, in the cooling mode, the ventilation air W which has been cooled by the interior evaporator 16 is blown into the vehicle cabin, thereby cooling the vehicle cabin.

In the low-temperature side cooling water circuit 40, the cooling water which has been cooled by the chiller 15 flows into the battery 42 and the charger 43 via the low-temperature side three-way valve 44. In the water passage of the battery 42 and the charger 43, the cooling water absorbs heat from the battery 42 and the charger 43, thereby cooling the battery 42 and the charger 43. The cooling water that has flowed out of the charger 43 is sucked into the low-temperature side pump 41 and is pumped to the water passage of the chiller 15 again.

That is, according to the vehicular air conditioner 1, the heat absorbed when cooling the ventilation air W and the heat absorbed when cooling the battery 42 and the charger 43 is capable of being absorbed from the cooling water of the low-temperature side cooling water circuit 40 to the low-pressure refrigerant by the chiller 15.

In the vehicular air conditioner 1, the heat absorbed by the chiller 15 and the interior evaporator 16 is drawn up in the refrigeration cycle system 10, and the heat is radiated to the cooling water of the high-temperature side cooling water circuit 20 in the water-refrigerant heat exchanger 12, whereby the cooling water is capable of being heated. In the vehicular air conditioner 1, the heat of the cooling water of the high-temperature side cooling water circuit 20 is capable of being radiated to the outside air OA by the radiator 21.

In this cooling mode, since the heat of the cooling water is radiated to the outside air OA by the high-temperature side cooling water circuit 20, the electric heater 26 is not operated. Needless to say, the electric heater 26 may be operated as needed.

(b) Heating Mode

The heating mode is a driving mode in which the ventilation air W is heated by the heater core 22 and blown into the vehicle cabin. In the following description, as an operating mode of the heating mode, a case where the outside air OA, the battery 42, and the like are used as heating heat sources to heat the vehicle cabin will be described.

In the heating mode in this case, the control device 70 opens the first expansion valve 14*a* at a predetermined throttle opening degree, and brings the second expansion valve 14*b* into a fully closed state. Accordingly, the refrigeration cycle system 10 of the heating mode includes a vapor compression type refrigeration cycle system in which the refrigerant circulates in the order of the compressor 11, the water-refrigerant heat exchanger 12, the refrigerant branching portion 13*a*, the first expansion valve 14*a*, the chiller 15, the refrigerant merging portion 13*b*, and the compressor 11.

That is, in the heating mode, the refrigerant is allowed to flow into the chiller 15, the heat absorbed from the cooling water of the low-temperature side cooling water circuit 40 is drawn up, and the refrigerant circuit capable of using for heating the ventilation air W is switched. In this cycle configuration, the control device 70 controls operations of various control target devices connected to the output side.

For example, the control device 70 controls the operation of the compressor 11 so that the high-pressure refrigerant pressure Pd measured by the high pressure sensor 72*d* becomes a target high pressure PCO. The target high pressure PCO is determined based on the target blowing temperature TAO with reference to a heating mode control map stored in advance in the control device 70. Specifically, in this control map, the target high pressure PCO is increased as the increase of the target blowing temperature TAO so that the ventilation air temperature TAV approaches the target blowing temperature TAO.

The control device 70 determines a control voltage (blowing capacity) of the blower 62, in the same manner as that in the cooling mode. The control device 70 controls the operation of the air mix door 64 so that the air flow passage on the heater core 22 side is fully opened to close the cold air bypass passage 65.

With respect to the high-temperature side cooling water circuit 20, the control device 70 operates the high-temperature side pump 27 so as to exhibit a predetermined water pumping capacity in the heating mode. The control device 70 controls the flow rate adjuster 30 so that the first electromagnetic valve 30*a* is in the fully closed state and the second electromagnetic valve 30*b* is in the fully opened state.

The control device 70 controls the amount of heat generation of the electric heater 26 based on the target blowing temperature TAO and the cooling water temperature in the high-temperature side cooling water circuit 20. Specifically, when the cooling water temperature flowing into the heater core 22 is insufficient to realize the target blowing temperature TAO, the amount of heat generation of the electric heater 26 is controlled so as to compensate for the insufficient temperature.

Therefore, the cooling water of the high-temperature side cooling water circuit 20 circulates in the order of the high-temperature side pump 27, the water-refrigerant heat exchanger 12, the electric heater 26, the branching portion 24, the second electromagnetic valve 30b, the heater core 22, the merging portion 25, and the high-temperature side pump 27.

With respect to the low-temperature side cooling water circuit, the control device 70 controls the operation of the low-temperature side pump 41 so as to exhibit the water pumping capacity in the heating mode. The control device 70 controls the operation of the low-temperature side three-way valve 44 to communicate all of three inflow and outflow ports with each other. Therefore, the cooling water in the low-temperature side cooling water circuit 40 flows through in the order of the low-temperature side pump 41, the chiller 15, and the low-temperature side three-way valve 44. Thereafter, one of the flows of the cooling water flows through in the order of the low-temperature side three-way valve 44, the battery 42, the charger 43, and the low-temperature side pump 41, and the other of the flows of the cooling water flows through in the order of the low-temperature side three-way valve 44, the radiator 21, the second reserve tank 29, and the low-temperature side pump 41.

The cooling water of the low-temperature side cooling water circuit 40 is heated by heat generated in the battery 42 and the like when passing through the water passage of the battery 42 and the charger 43. When the cooling water passes through the radiator 21, the cooling water of the low-temperature side cooling water circuit 40 absorbs heat from the outside air OA by heat exchange with the outside air OA. That is, in the heating mode, the vehicular air conditioner 1 is capable of using the battery 42, the charger 43, and the outside air OA as heat sources for heating.

In the device cooling water circuit 50, the control device 70 controls the operation of the device pump 52 so as to exhibit a predetermined water pumping capacity in the heating mode. The control device 70 controls the operation of the device three-way valve 53 so that the inflow and outflow ports on the vehicle-mounted device 51 side and the inflow and outflow ports on the bypass passage 54 side communicate with each other, and the remaining inflow and outflow ports are closed. Therefore, the cooling water in the device cooling water circuit 50 circulates in the order of the device pump 52, the vehicle-mounted device 51, the device three-way valve 53, the bypass passage 54, and the device pump 52.

In such a heating mode, the cooling water of the low-temperature side cooling water circuit 40 is capable of absorbing heat from the outside air OA when passing through the radiator 21. When the cooling water passes through the water passage of the battery 42 and the charger 43, the cooling water absorbs heat generated in the battery 42 and the charger 43, and is capable of cooling the battery 42 and the charger 43.

In the refrigeration cycle system 10 in the heating mode, the high-pressure refrigerant flowing out of the refrigerant passage of the water-refrigerant heat exchanger 12 flows into the first expansion valve 14a via the refrigerant branching portion 13a and is reduced in pressure. The throttle opening degree of the first expansion valve 14a is adjusted so that the refrigerant on the outlet side of the chiller 15 is in a gas-liquid two-phase state. The low-pressure refrigerant is evaporated by heat exchange of the cooling water of the low-temperature side cooling water circuit 40 in the chiller 15, and is capable of absorbing heat from the cooling water of the low-temperature side cooling water circuit 40.

The refrigerant absorbing heat from the cooling water of the low-temperature side cooling water circuit 40 is compressed by the compressor 11 and discharged to the water-refrigerant heat exchanger 12 as a high-pressure refrigerant. In the water-refrigerant heat exchanger 12, since the high-temperature side pump 27 operates, the high-pressure refrigerant and the cooling water of the high-temperature side cooling water circuit 20 exchange heat, and the high-pressure refrigerant is cooled and condensed. Therefore, the cooling water of the high-temperature side cooling water circuit 20 is heated by the heat of the high-pressure refrigerant.

In the high-temperature side cooling water circuit 20, the cooling water heated by the water-refrigerant heat exchanger 12 flows into the heater core 22 via the second electromagnetic valve 30b. Since the air mix door 64 fully opens the air flow passage on the heater core 22 side, the cooling water flowing into the heater core 22 exchanges heat with the ventilation air W passing through the interior evaporator 16 to radiate heat.

Thus, in the heating mode, the ventilation air W is heated, and the temperature of the ventilation air W approaches the target blowing temperature TAO. The cooling water flowing out of the heater core 22 is sucked into the high-temperature side pump 27 and is pumped to the water passage of the water-refrigerant heat exchanger 12 again.

Therefore, in the heating mode, the vehicular air conditioner 1 heats the ventilation air W by the heater core 22 and blows the ventilation air W into the vehicle cabin, whereby the vehicle cabin is capable of being heated. That is, in the heating mode, the vehicular air conditioner 1 is capable of drawing up heat absorbed from the battery 42, the charger 43, and the outside air OA in the low-temperature side cooling water circuit 40 in the refrigeration cycle system 10, and use the heat for heating the ventilation air W via the high-temperature side cooling water circuit 20.

In the vehicular air conditioner 1 in the heating mode, the cooling water of the high-temperature side cooling water circuit 20 is capable of being heated by the electric heater 26 as an auxiliary heat source. Therefore, even when the amount of heat added to the water-refrigerant heat exchanger 12 is insufficient to realize the target blowing temperature TAO in the heater core 22, the insufficient amount is capable of being compensated for by the heating by the electric heater 26.

As illustrated in FIG. 1, the electric heater 26 is disposed on the upstream side of the branching portion 24 in the common passage 23 of the high-temperature side cooling water circuit 20, and more specifically, is disposed between the branching portion 24 and the water-refrigerant heat exchanger 12.

Therefore, in the high-temperature side cooling water circuit 20, the device and length in the passage from the electric heater 26, which is the auxiliary heat source, to the heater core 22, can be reduced as much as possible and the heat applied by the electric heater 26 to the heater core 22 can be transferred with a small loss. In other words, the vehicular air conditioner 1 is capable of efficiently utilizing the heat generated by the electric heater 26 for heating the vehicle cabin.

(c) Defrosting Mode

The defrosting mode is a driving mode for removing frost on the radiator 21 when the radiator 21 is frosted. When the radiator 21 is frosted, in the heating mode, it is considered that the amount of heat absorption from the outside air OA is lowered, and the heating efficiency is lowered.

For example, in the heating mode, when the operation condition of the vehicle in which the heat generation of the battery 42 increases is satisfied, it is considered that the battery 42 is sufficiently cooled in order to keep the temperature of the battery 42 within a predetermined temperature range. In this case, in order to sufficiently lower the cooling water temperature of the low-temperature side cooling water circuit 40, the refrigerant evaporation temperature in the chiller 15 is lowered below 0° C.

Thus, the cooling water of the low-temperature side cooling water circuit 40 cooled to a very low temperature also flows into the radiator 21 connected in parallel to the battery 42 and the charger 43, exchanges heat with the outside air OA, and absorbs heat. At this time, when the outside air OA is at a low temperature and high humidity, it is assumed that the surface of the radiator 21 is frosted.

In order to cope with frosting of the radiator 21 that occurs in such a case, the vehicular air conditioner 1 executes the defrosting mode. Specifically, as an example of the defrosting mode, an aspect in which the radiator 21 is defrosted while the battery 42 is cooled will be described.

In the defrosting mode in this case, the control device 70 opens at least the first expansion valve 14*a* at a predetermined throttle opening degree. Accordingly, in the refrigeration cycle system 10 in the defrosting mode, at least a vapor compression type refrigeration cycle system is configured in which the refrigerant circulates in the order of the compressor 11, the water-refrigerant heat exchanger 12, the refrigerant branching portion 13*a*, the first expansion valve 14*a*, the chiller 15, the refrigerant merging portion 13*b*, and the compressor 11.

In the defrosting mode, the opening degree of the second expansion valve 14*b* may be a predetermined throttle opening degree or may be a fully closed state. This point is determined based on the necessity of cooling the ventilation air W by the interior evaporator 16 in the defrosting mode.

The control device 70 controls the operations of various control target devices connected to the output side. The refrigerant discharge capacity of the compressor 11, the blowing capacity of the blower 62, and the opening degree of the air mix door 64 are appropriately determined according to the necessity of the air conditioning operation in the defrosting mode.

With respect to the high-temperature side cooling water circuit 20, the control device 70 operates the high-temperature side pump 27 so as to exhibit a predetermined water pumping capacity in the defrosting mode. The control device 70 controls the flow rate adjuster 30 so that at least the first electromagnetic valve 30*a* is in the fully opened state.

The opening degree of the second electromagnetic valve 30*b* may be a predetermined opening degree or may be a fully closed state. The opening degree of the second electromagnetic valve 30*b* is appropriately determined in accordance with whether heating of the ventilation air W is necessary. In this respect, it is desirable that the opening degree of the second electromagnetic valve 30*b* is smaller than the opening degree of the first electromagnetic valve 30*a*. This is because in the defrosting mode, defrosting of the radiator 21 is given priority over heating capacity by the heater core 22.

In the defrosting mode, the control device 70 controls the amount of heat generation of the electric heater 26 based on the cooling water temperature in each portion in the high-temperature side cooling water circuit 20. Specifically, when the cooling water temperature flowing into the radiator 21 is insufficient with respect to the temperature necessary for defrosting the radiator 21, the amount of heat generation of the electric heater 26 is controlled so as to compensate for temperature.

Therefore, the cooling water of the high-temperature side cooling water circuit 20 circulates in the order of the high-temperature side pump 27, the water-refrigerant heat exchanger 12, the electric heater 26, the branching portion 24, the first electromagnetic valve 30*a*, the second reserve tank 29, the radiator 21, the merging portion 25, and the high-temperature side pump 27.

With respect to the low-temperature side cooling water circuit, the control device 70 controls the operation of the low-temperature side pump 41 so as to exhibit the water pumping capacity in the defrosting mode. The control device 70 controls the operation of the low-temperature side three-way valve 44 to allow the inflow and outflow ports on the chiller 15 side to communicate with the inflow and outflow ports on the battery 42 side, and close the remaining inflow and outflow ports. Therefore, the cooling water in the low-temperature side cooling water circuit 40 circulates in the order of the low-temperature side pump 41, the chiller 15, the low-temperature side three-way valve 44, the battery 42, the charger 43, and the low-temperature side pump 41.

The cooling water of the low-temperature side cooling water circuit 40 is heated by heat generated in the battery 42 and the like when passing through the water passage of the battery 42 and the charger 43. When the cooling water of the low-temperature side cooling water circuit 40 passes through the chiller 15, heat is absorbed by the low-pressure refrigerant.

According to the vehicular air conditioner 1, the heat absorbed by the low-pressure refrigerant is drawn up by the refrigeration cycle system 10, and is used for heating the cooling water of the high-temperature side cooling water circuit 20 in the water-refrigerant heat exchanger 12. That is, the vehicular air conditioner 1 is capable of utilizing the exhaust heat of the battery 42 and the charger 43 for defrosting the radiator 21.

In the device cooling water circuit 50, the control device 70 controls the operation of the device pump 52 so as to exhibit a predetermined water pumping capacity in the defrosting mode. The control device 70 controls the operation of the device three-way valve 53 so that the inflow and outflow ports on the vehicle-mounted device 51 side and the inflow and outflow ports on the bypass passage 54 side communicate with each other, and the remaining inflow and outflow ports are closed. Therefore, the cooling water in the device cooling water circuit 50 circulates in the order of the device pump 52, the vehicle-mounted device 51, the device three-way valve 53, the bypass passage 54, and the device pump 52.

In such a defrosting mode, the cooling water of the low-temperature side cooling water circuit 40 absorbs heat generated in the battery 42 and the charger 43 when passing through the water passages of the battery 42 and the charger 43, and is capable of cooling the battery 42 and the charger 43.

In the refrigeration cycle system 10 in the defrosting mode, the high-pressure refrigerant flowing out of the refrigerant passage of the water-refrigerant heat exchanger 12 flows into the first expansion valve 14*a* via the refrigerant branching portion 13*a*, and is reduced in pressure. The low-pressure refrigerant evaporates by heat exchange of the cooling water of the low-temperature side cooling water circuit 40 in the chiller 15, and absorbs heat from the cooling water of the low-temperature side cooling water circuit 40.

The refrigerant absorbing heat from the cooling water of the low-temperature side cooling water circuit 40 is compressed by the compressor 11 and discharged to the water-refrigerant heat exchanger 12 as a high-pressure refrigerant. In the water-refrigerant heat exchanger 12, since the high-temperature side pump 27 operates, the high-pressure refrigerant and the cooling water of the high-temperature side cooling water circuit 20 exchange heat, and the high-pressure refrigerant is cooled and condensed. Therefore, the cooling water of the high-temperature side cooling water circuit 20 is heated by the heat of the high-pressure refrigerant.

In the high-temperature side cooling water circuit 20, the cooling water heated by the water-refrigerant heat exchanger 12 or the like flows into the radiator 21 via the first electromagnetic valve 30a. When the heated cooling water flows into the radiator 21, the frost of the radiator 21 is melted and removed by the heat of the cooling water.

Therefore, in the defrosting mode, the vehicular air conditioner 1 is capable of defrosting the radiator 21 by allowing the cooling water of the heated high-temperature side cooling water circuit 20 to flow into the radiator 21, and is capable of restore the heating capacity.

In the defrosting mode, the vehicular air conditioner 1 is capable of drawing up heat absorbed from the battery 42 and the charger 43 by the low-temperature side cooling water circuit 40 in the refrigeration cycle system 10 and use the heat for defrosting the radiator 21 via the high-temperature side cooling water circuit 20.

In the vehicular air conditioner 1 of the defrosting mode, the cooling water of the high-temperature side cooling water circuit 20 is capable of being heated by the electric heater 26 as an auxiliary heat source. Therefore, even when the amount of heat added to the water-refrigerant heat exchanger 12 is insufficient to realize the defrosting of the radiator 21, the insufficient amount is capable of being compensated for by heating by the electric heater 26.

As illustrated in FIG. 1, the electric heater 26 is disposed on the upstream side of the branching portion 24 in the common passage 23 of the high-temperature side cooling water circuit 20, and more specifically, is disposed between the water-refrigerant heat exchanger 12 and the branching portion 24.

Therefore, in the high-temperature side cooling water circuit 20, the device and length in the passage from the electric heater 26, which is the auxiliary heat source, to the radiator 21 can be reduced as much as possible, and the heat applied by the electric heater 26 to the radiator 21 can be transferred with a small loss. In other words, the vehicular air conditioner 1 is capable of efficiently utilizing the heat generated by the electric heater 26 for the defrosting of the radiator 21.

As described above, according to the vehicular air conditioner 1 of the first embodiment, the cooling mode, the heating mode, and the defrosting mode are capable of being realized out of multiple driving modes by switching the operations of the refrigeration cycle system 10 and each cooling water circuit. Therefore, the vehicular air conditioner 1 is capable of performing comfortable air conditioning in the vehicle cabin and temperature adjustment of various devices.

As illustrated in FIG. 1, in the vehicular air conditioner 1 according to the first embodiment, the high-temperature side cooling water circuit 20 has the electric heater 26 as an auxiliary heat source on the upstream side of the branching portion 24 in the common passage 23.

In the high-temperature side cooling water circuit 20, the radiator 21 and the heater core 22 are connected in parallel to the common passage 23. The flow of the cooling water in the high-temperature side cooling water circuit 20 is capable of being switched by the flow rate adjuster 30 to the flow toward the radiator 21 and the flow toward the heater core 22.

Therefore, the vehicular air conditioner 1 is capable of transferring the heat of the electric heater 26, which is the auxiliary heat source, to the heater core 22, so that the electric heater 26 is capable of being used as the auxiliary heat source for heating the vehicle cabin. Since the vehicular air conditioner 1 is capable of transferring the heat of the electric heater 26 to the radiator 21, the heat of the electric heater 26 is capable of being used as an auxiliary heat source for defrosting the radiator 21.

In the common passage 23 of the high-temperature side cooling water circuit 20, the electric heater 26 is disposed on the upstream side of the branching portion 24. Specifically, the electric heater 26 is disposed between the branching portion 24 and the water-refrigerant heat exchanger 12 in the common passage 23.

Therefore, also in both the case where the cooling water of the high-temperature side cooling water circuit 20 flows into the radiator 21 side and the case where the cooling water flows into the heater core 22 side, the passage length from the electric heater 26 and the number of devices passing through the electric heater 26 are capable of being reduced. That is, according to the vehicular air conditioner 1, when the electric heater 26 is used as the auxiliary heat source, also in both the case of being used for the heating assistance and the case of being used for the defrosting assistance, heat loss is capable of being restricted and efficiently used.

As illustrated in FIG. 1, in the common passage 23 of the high-temperature side cooling water circuit 20, the high-temperature side pump 27 is disposed on the upstream side of the water-refrigerant heat exchanger 12 with respect to the flow of the cooling water in the common passage 23. Therefore, also in both the case where the cooling water of the high-temperature side cooling water circuit 20 flows into the radiator 21 side and the case where the cooling water flows into the heater core 22 side, the required output of the high-temperature side pump 27 is capable of being restricted to be low. That is, the vehicular air conditioner 1 is capable of reducing the cost and power required for the high-temperature side pump 27.

In the high-temperature side cooling water circuit 20, the radiator 21 for exchanging heat between the cooling water and the outside air OA is disposed. In the cooling mode, the heat of the cooling water is capable of being radiated to the outside air OA by the radiator 21. In the heating mode, by absorbing heat from the outside air OA by the radiator 21, the outside air OA is capable of being used as a heating heat source.

By realizing the defrosting mode, the frosted radiator 21 is capable of being defrosted, the efficiency when the outside air OA is used as a heating heat source is capable of being restored, and the heating capacity of the vehicular air conditioner 1 is capable of being improved.

Second Embodiment

Next, a second embodiment different from the first embodiment described above will be described with reference to FIGS. 4 and 5. In the second embodiment, instead of the radiator 21 in the first embodiment, a complex heat exchanger 35 is employed. Other configurations are the same as those of the first embodiment, and therefore redundant description thereof is omitted.

The complex heat exchanger 35 is a heat exchanger in which a heat dissipating portion 35a for exchanging heat between a cooling water of a high-temperature side cooling water circuit 20 and an outside air OA, and a heat absorbing portion for exchanging heat between the cooling water circulating in a low-temperature side cooling water circuit 40 and the outside air OA are integrally formed. The heat dissipating portion 35a and the heat absorbing portion 35b of the complex heat exchanger 35 have a so-called tank-and-tube type heat exchanger structure.

The tank-and-tube type heat exchanger for exchanging heat between a heat medium (that is, cooling water) and air (that is, outside air) has multiple tubes for allowing the heat medium to flow, a tank for performing distribution or collection of the heat medium flowing through multiple tubes, and the like. The structure is such that heat is exchanged between the heat medium flowing through the tubes stacked at intervals to each other and disposed in a predetermined direction and the air flowing through an air passage provided between the adjacent tubes.

Figure 5:
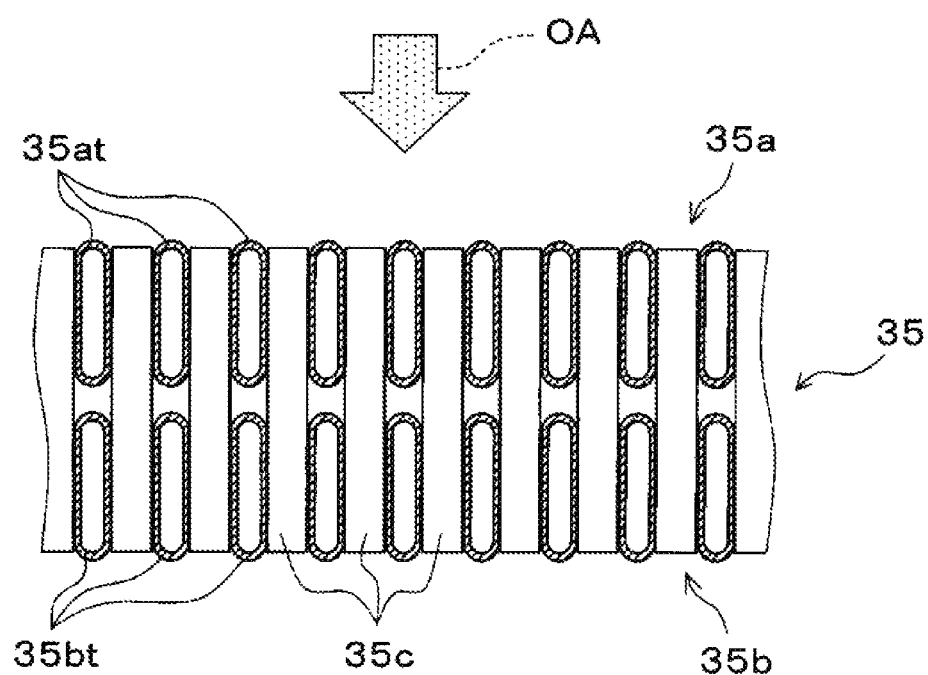
FIG. 5 is a schematic view illustrating a configuration of a complex heat exchanger according to the second embodiment.

As illustrated in FIG. 5, heat exchange fins 35c are disposed in an air passage provided between the tubes 35at in the heat dissipating portion 35a and an air passage formed between the tubes 35bt in the heat absorbing portion 35b. The heat exchange fin 35c is formed of one thin plate shape metal member. The heat exchange fin 35c is a member that promotes the heat exchange between the cooling water and the outside air OA in the heat dissipating portion 35a, and promotes the heat exchange between the cooling water and the outside air OA in the heat absorbing portion 35b.

In the complex heat exchanger 35, the heat exchange fin 35c is brazed to both the tube 35at of the heat dissipating portion 35a and the tube 35bt of the heat absorbing portion 35b, and connects the heat dissipating portion 35a and the heat absorbing portion 35b. Therefore, the complex heat exchanger 35 is configured to be able to transfer heat between the cooling water on the heat dissipating portion 35a side and the cooling water on the heat absorbing portion 35b side via the heat exchange fins 35c. The heat exchange fin 35c is an example of a heat transfer portion.

Figure 4:
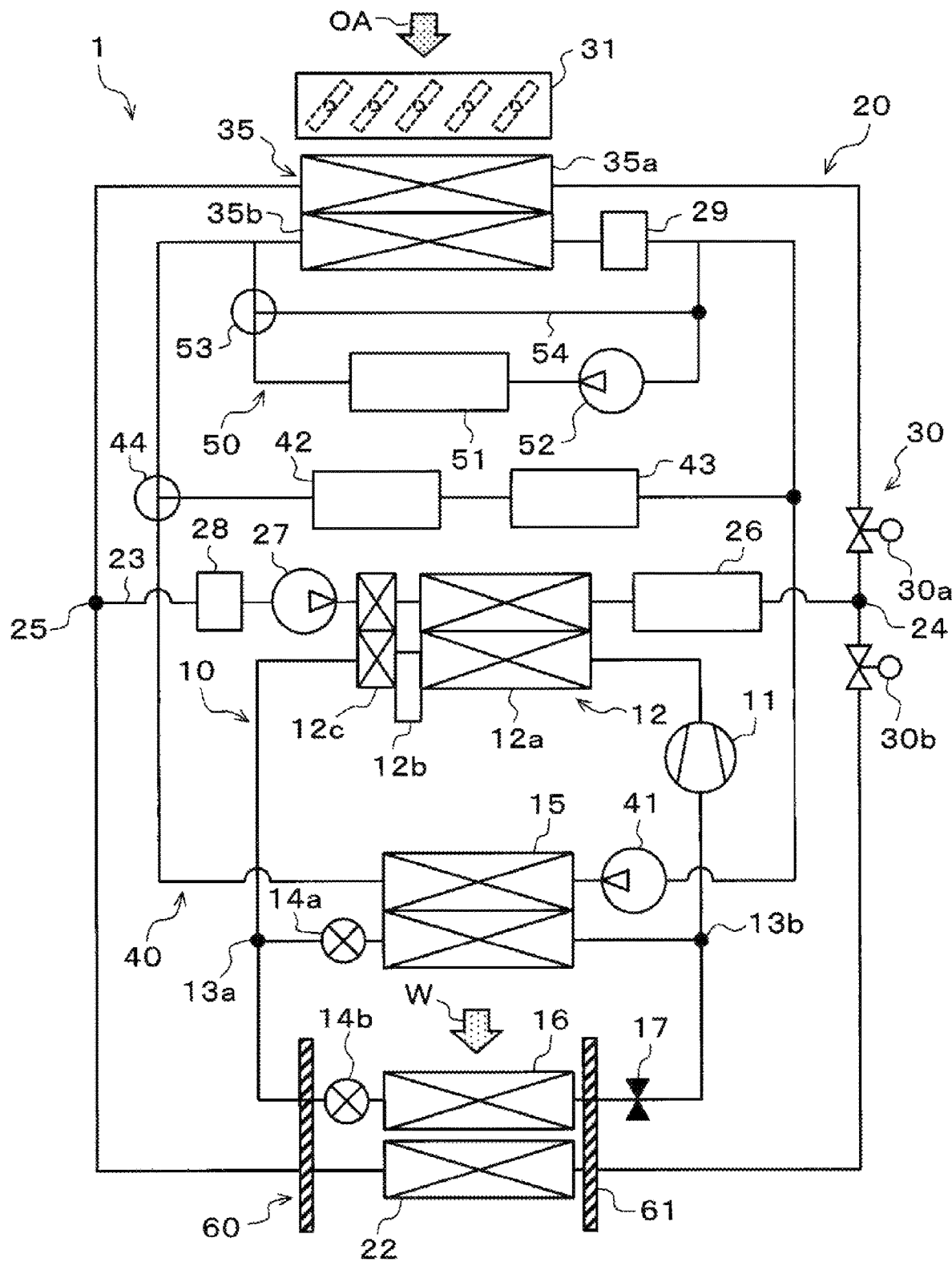
FIG. 4 is an overall configuration diagram of a vehicular air conditioner according to a second embodiment.

As illustrated in FIG. 4, one outlet side of a branching portion 24 is connected to the inlet side of the heat dissipating portion 35a in the complex heat exchanger 35 via a first electromagnetic valve 30a. One outlet side of a merging portion 25 is connected to the outlet side of the heat dissipating portion 35a.

A suction port side of a low-temperature side pump 41 and an outlet side of a water passage in a charger 43 are connected to the inlet side of the heat absorbing portion 35b in the complex heat exchanger 35 via a second reserve tank 29. On the other hand, one of inflow and outflow ports of a low-temperature side three-way valve 44 is connected to the outlet side of the heat absorbing portion 35b.

In a vehicular air conditioner 1 according to the second embodiment, the heat dissipating portion 35a is disposed on a vehicle front side with respect to the heat absorbing portion 35b. In other words, the heat dissipating portion 35a is disposed on an upstream side of the heat absorbing portion 35b with respect to the flow of the outside air OA.

As illustrated in FIG. 4, a cooling water pipe of a device cooling water circuit 50 is connected to a cooling water pipe on the inlet side of a second reserve tank 29. A cooling water pipe connected to inflow and outflow ports of a device three-way valve 53 is connected to a cooling water pipe which connects the heat absorbing portion 35b and a low-temperature side three-way valve 44.

Next, in the vehicular air conditioner 1 according to the second embodiment configured as described above, an example of each of driving modes of a cooling mode, a heating mode, and a defrosting mode will be described.

(a) Cooling Mode

In a refrigeration cycle system 10 of the cooling mode according to the second embodiment, a refrigerant circuit circulating in the order of a compressor 11, a water-refrigerant heat exchanger 12, one side of a refrigerant branching portion 13a, a first expansion valve 14a, a chiller 15, a refrigerant merging portion 13b, and a compressor 11 is configured. A refrigerant circuit circulating in the order of the compressor 11, the water-refrigerant heat exchanger 12, the other side of the refrigerant branching portion 13a, a second expansion valve 14b, an interior evaporator 16, an evaporation pressure regulation valve 17, a refrigerant merging portion 13b, and the compressor 11 is configured in parallel.

In the high-temperature side cooling water circuit 20 of the cooling mode, operations of configuration devices are controlled in the same manner as those in the first embodiment. Therefore, a cooling water circuit circulating in the order of a high-temperature side pump 27, a water-refrigerant heat exchanger 12, an electric heater 26, a branching portion 24, the first electromagnetic valve 30a, the heat dissipating portion 35a of the complex heat exchanger 35, the merging portion 25, the first reserve tank 28, and the high-temperature side pump 27.

In the low-temperature side cooling water circuit 40 in the cooling mode, the operation of each configuration device is controlled in the same manner as that in the first embodiment. Therefore, in the low-temperature side cooling water circuit 40, a cooling water circuit circulating in the order of the low-temperature side pump 41, the chiller 15, the low-temperature side three-way valve 44, the battery 42, the charger 43, and the low-temperature side pump 41 is configured.

In the device cooling water circuit 50 of the cooling mode, a cooling water circuit is configured in which the cooling water circulates in the order of a device pump 52, a vehicle-mounted device 51, a device three-way valve 53, a bypass passage 54, and a device pump 52.

As described above, also in the cooling mode in the second embodiment, similar to the first embodiment, since a ventilation air W is capable of being cooled by the interior evaporator 16, cooling of the vehicle cabin is capable of being realized. Since the chiller 15 is capable of cooling the cooling water of the low-temperature side cooling water circuit 40, cooling of the battery 42 and the charger 43 is capable of being realized.

(b) Heating Mode

In the refrigeration cycle system 10 in the heating mode according to the second embodiment, a refrigerant circuit circulating in the order of the compressor 11, the water-refrigerant heat exchanger 12, one side of the refrigerant branching portion 13a, the first expansion valve 14a, the chiller 15, the refrigerant merging portion 13b, and the compressor 11 is configured.

In the high-temperature side cooling water circuit 20 of the heating mode, the operation of the configuration device is controlled in the same manner as that in the heating mode of the first embodiment. Therefore, a cooling water circuit circulating in the order of the high-temperature side pump 27, the water-refrigerant heat exchanger 12, the electric heater 26, the branching portion 24, the second electromagnetic valve 30b, the heater core 22, the merging portion 25, the first reserve tank 28, and the high-temperature side pump 27 is configured.

In the low-temperature side cooling water circuit 40 of the heating mode, a cooling water circuit flowing in the order of the low-temperature side pump 41, the chiller 15, the low-temperature side three-way valve 44, the battery 42, the charger 43, and the low-temperature side pump 41 is configured. A cooling water circuit circulating in the order the low-temperature side pump 41, the chiller 15, the low-temperature side three-way valve 44, the heat absorbing portion 35b of the complex heat exchanger 35, the second reserve tank 29, and the low-temperature side pump 41 is configured in parallel.

In the device cooling water circuit 50 of the heating mode, a cooling water circuit in which cooling water circulates in the order of the device pump 52, the vehicle-mounted device 51, the device three-way valve 53, the bypass passage 54, and the device pump 52 is configured.

Therefore, in the heating mode, the vehicular air conditioner 1 heats the ventilation air W by the heater core 22 and blows the ventilation air W into the vehicle cabin, whereby the vehicle cabin is capable of being heated. That is, in the heating mode, the vehicular air conditioner 1 is capable of drawing up heat absorbed from the battery 42, the charger 43, and the outside air OA in the low-temperature side cooling water circuit 40 in the refrigeration cycle system 10, and use the heat for heating the ventilation air W via the high-temperature side cooling water circuit 20.

In the vehicular air conditioner 1 in the heating mode, the cooling water of the high-temperature side cooling water circuit 20 is capable of being heated by the electric heater 26 as an auxiliary heat source. Therefore, even when the amount of heat added to the water-refrigerant heat exchanger 12 is insufficient to realize the target blowing temperature TAO in the heater core 22, the insufficient amount is capable of being compensated for by the heating by the electric heater 26.

The electric heater 26 is disposed on the upstream side of the branching portion 24 in the common passage 23 of the high-temperature side cooling water circuit 20, and more specifically, is disposed between the electric heater 26 and the water-refrigerant heat exchanger 12. Therefore, in the high-temperature side cooling water circuit 20, since the device and the length in the passage from the electric heater 26, which is the auxiliary heat source, to the heater core 22 is capable of being reduced as much as possible, the heat by the electric heater 26 is capable of being efficiently utilized for the heating of the vehicle cabin.

(c) Defrosting Mode

In the refrigeration cycle system 10 of the defrosting mode according to the second embodiment, a refrigerant circuit circulating in the order of the compressor 11, the water-refrigerant heat exchanger 12, one side of the refrigerant branching portion 13a, the first expansion valve 14a, the chiller 15, the refrigerant merging portion 13b, and the compressor 11 is configured.

In the high-temperature side cooling water circuit 20 of the defrosting mode, the operation of the configuration device is controlled in the same manner as that in the defrosting mode of the first embodiment. Therefore, a cooling water circuit circulating in the order of a high-temperature side pump 27, a water-refrigerant heat exchanger 12, an electric heater 26, a branching portion 24, the first electromagnetic valve 30a, the heat dissipating portion 35a of the complex heat exchanger 35, the merging portion 25, the first reserve tank 28, and the high-temperature side pump 27.

In the low-temperature side cooling water circuit 40 of the defrosting mode, a cooling water circuit flowing in the order of the low-temperature side pump 41, the chiller 15, the low-temperature side three-way valve 44, the battery 42, the charger 43, and the low-temperature side pump 41 is configured.

In the device cooling water circuit 50 of the defrosting mode, a cooling water circuit in which the cooling water circulates in the order of the device pump 52, the vehicle-mounted device 51, the device three-way valve 53, the bypass passage 54, and the device pump 52 is configured.

Therefore, in the defrosting mode, the heat absorbed from the battery 42 and the charger 43 is capable of being drawn up by the refrigeration cycle system 10 in the low-temperature side cooling water circuit 40 and used for defrosting the heat absorbing portion 35b in the complex heat exchanger 35 via the high-temperature side cooling water circuit 20.

In the complex heat exchanger 35, the heat dissipating portion 35a and the heat absorbing portion 35b are connected by heat exchange fins, and are configured to be capable of performing the heat transfer. Therefore, by allowing the heated cooling water of the high-temperature side cooling water circuit 20 to flow into the heat dissipating portion 35a of the complex heat exchanger 35, the defrosting of the frosted heat absorbing portion 35b is capable of being performed, and the heating capacity is capable of being restored.

As illustrated in FIG. 4, in the complex heat exchanger 35, the heat dissipating portion 35a is disposed on the upstream side of the heat absorbing portion 35b with respect to the flow direction of the outside air OA. Therefore, the heat of the cooling water of the high-temperature side cooling water circuit 20 flowing into the heat dissipating portion 35a is capable of being transferred to the frosted heat absorbing portion 35b via the outside air OA. Thus, according to the defrosting mode of the second embodiment, in addition to the heat transfer by the heat exchange fins, the heat transfer via the outside air OA is also performed, so that the defrosting of the heat absorbing portion 35b is capable of being performed more quickly.

In the vehicular air conditioner 1 of the defrosting mode, the cooling water of the high-temperature side cooling water circuit 20 is capable of being heated by the electric heater 26 as an auxiliary heat source. Therefore, even when the amount of heat added to the water-refrigerant heat exchanger 12 is insufficient to realize the defrosting of the heat absorbing portion 35b in the complex heat exchanger 35, the insufficient amount is capable of being compensated for by heating by the electric heater 26.

As illustrated in FIG. 4, the electric heater 26 is disposed on the upstream side of the branching portion 24 in the common passage 23 of the high-temperature side cooling water circuit 20, and more specifically, is disposed between the water-refrigerant heat exchanger 12 and the branching portion 24.

Therefore, in the high-temperature side cooling water circuit 20, the device and the length in the passage from the electric heater 26, which is the auxiliary heat source, to the heat absorbing portion 35b of the complex heat exchanger 35 is capable of being reduced as much as possible, and the heat by the electric heater 26 is capable of being efficiently utilized for the defrosting of heat absorbing portion 35b.

In the device cooling water circuit 50 of the defrosting mode according to the second embodiment, the circuit configuration of the cooling water circuit may be changed by controlling the operation of the device three-way valve 53. That is, in the device cooling water circuit 50, a cooling water circuit may be used in which the cooling water circulates in the order of the device pump 52, the vehicle-mounted device 51, the device three-way valve 53, the heat absorbing portion 35b of the complex heat exchanger 35, the second reserve tank 29, and the device pump 52.

With the circuit configuration, the cooling water that absorbs the exhaust heat of the vehicle-mounted device 51 is capable of being supplied to the heat absorbing portion 35b of the frosted complex heat exchanger 35, so that the exhaust heat of the vehicle-mounted device 51 is capable of being used for the defrosting of the heat absorbing portion 35b.

As described above, according to the vehicular air conditioner 1 of the second embodiment, even when the complex heat exchanger 35 having the heat dissipating portion 35a and the heat absorbing portion 35b is used, the operational effects achieved from the common configuration and operation with the first embodiment are capable of being obtained in the same manner as those in the first embodiment.

In the complex heat exchanger 35 according to the second embodiment, the heat dissipating portion 35a is connected to the heat absorbing portion 35b by the heat exchange fins so as to be able to perform the heat transfer. Therefore, in the defrosting mode, the heat of the cooling water flowing into the heat dissipating portion 35a is capable of being transferred to the frosted heat absorbing portion 35b via the heat exchange fins.

In the second embodiment, the heat dissipating portion 35a of the complex heat exchanger 35 is disposed on the upstream side of the heat absorbing portion 35b with respect to the flow of the outside air OA. Therefore, the heat of the cooling water flowing into the heat dissipating portion 35a is capable of being transferred to the frosted heat absorbing portion 35b via the outside air OA.

Third Embodiment

Next, a third embodiment different from the above-described each embodiment will be described with reference to FIG. 6. In the third embodiment, similar to the second embodiment, a complex heat exchanger 35 is employed instead of the radiator 21.

In the third embodiment, the disposition of a heat dissipating portion 35a and a heat absorbing portion 35b in the complex heat exchanger 35 is different from that in the second embodiment. Other points are the same as those of the above-described embodiments, and therefore, redundant description thereof is omitted.

Figure 6:
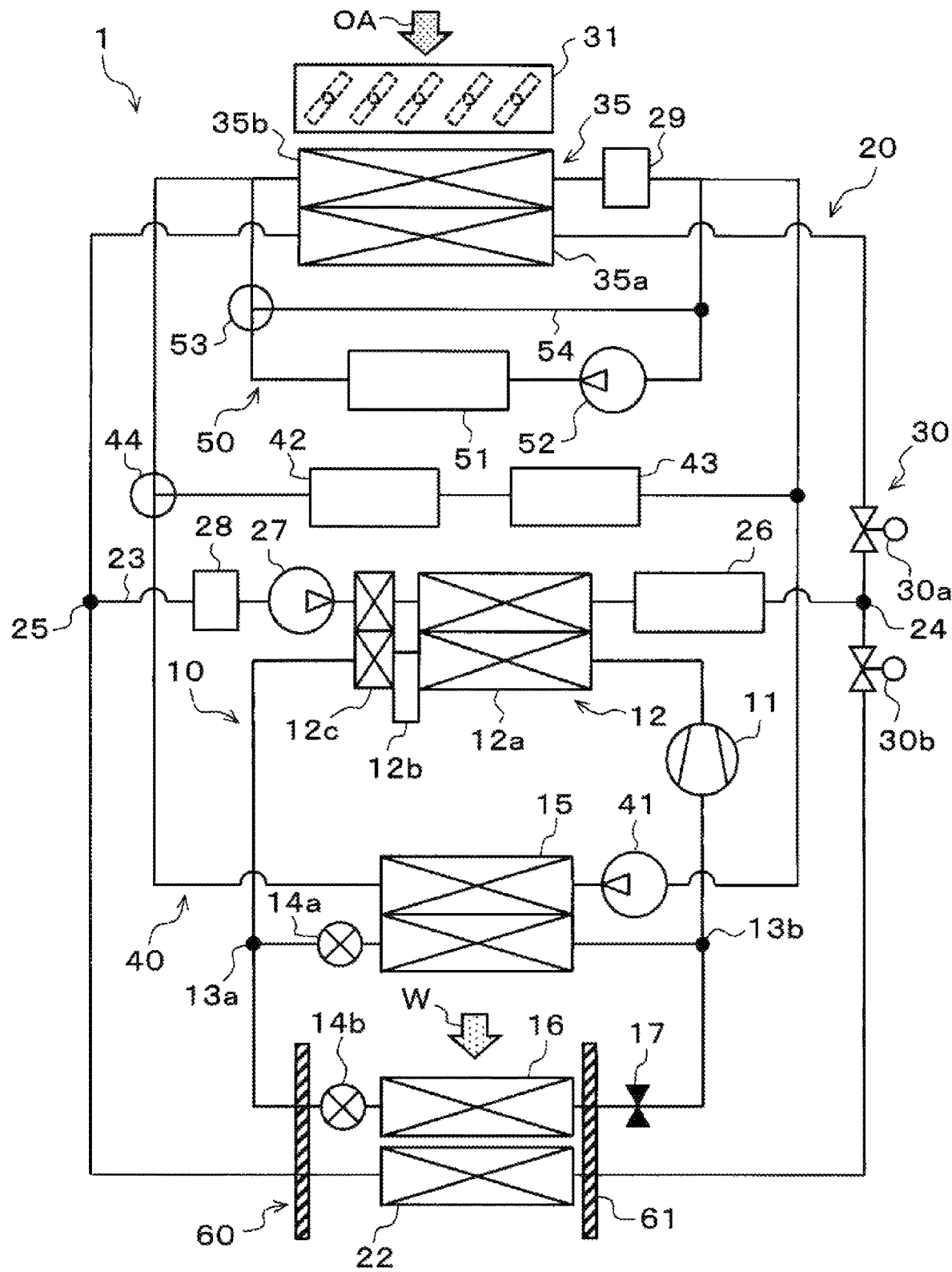
FIG. 6 is an overall configuration diagram of a vehicular air conditioner according to a third embodiment.

As illustrated in FIG. 6, in a vehicular air conditioner 1 according to the third embodiment, the heat absorbing portion 35b of the complex heat exchanger 35 is disposed on a front side of a heat dissipating portion 35a. In other words, the heat absorbing portion 35b is disposed on an upstream side of the heat dissipating portion 35a with respect to a flow direction of an outside air OA. A connection mode of a cooling water pipe to the heat dissipating portion 35a and a connection mode of a cooling water pipe to the heat absorbing portion 35b are the same as those in the second embodiment described above.

In order to realize a cooling mode, a heating mode, and a defrosting mode, the vehicular air conditioner 1 according to the third embodiment controls an operation of each configuration device in the same manner as that in the second embodiment. In this respect, since the description has already been made in the second embodiment, redundant description is omitted.

As described above, according to the vehicular air conditioner 1 of the third embodiment, even when the complex heat exchanger 35 is used, the operational effects achieved from the common configuration and operation with those in the first embodiment and the second embodiment are capable of being obtained in the same manner as those in the first embodiment and the second embodiment.

In particular, in the complex heat exchanger 35, even when the heat absorbing portion 35b is disposed on the upstream side of the heat dissipating portion 35a with respect to the flow direction of the outside air OA, the operational effects achieved from the common configuration and operation are capable of being obtained.

Also in the complex heat exchanger 35 according to the third embodiment, the heat dissipating portion 35a is connected to the heat absorbing portion 35b by heat exchange fins so as to be able to perform the heat transfer. Therefore, the heat of the cooling water flowing into the heat dissipating portion 35a in the defrosting mode is capable of being transferred to the frosted heat absorbing portion 35b via the heat exchange fins.

Fourth Embodiment

Next, a fourth embodiment different from the above-described each embodiment will be described with reference to FIG. 7. In the fourth embodiment, instead of the electric heater 26 in the first embodiment, a heating device 36 is employed as an auxiliary heat source, and the disposition of the configuration devices in a common passage 23 of a high-temperature side cooling water circuit 20 is changed. Other configurations are the same as those of the first embodiment, and therefore redundant description thereof is omitted.

Figure 7:
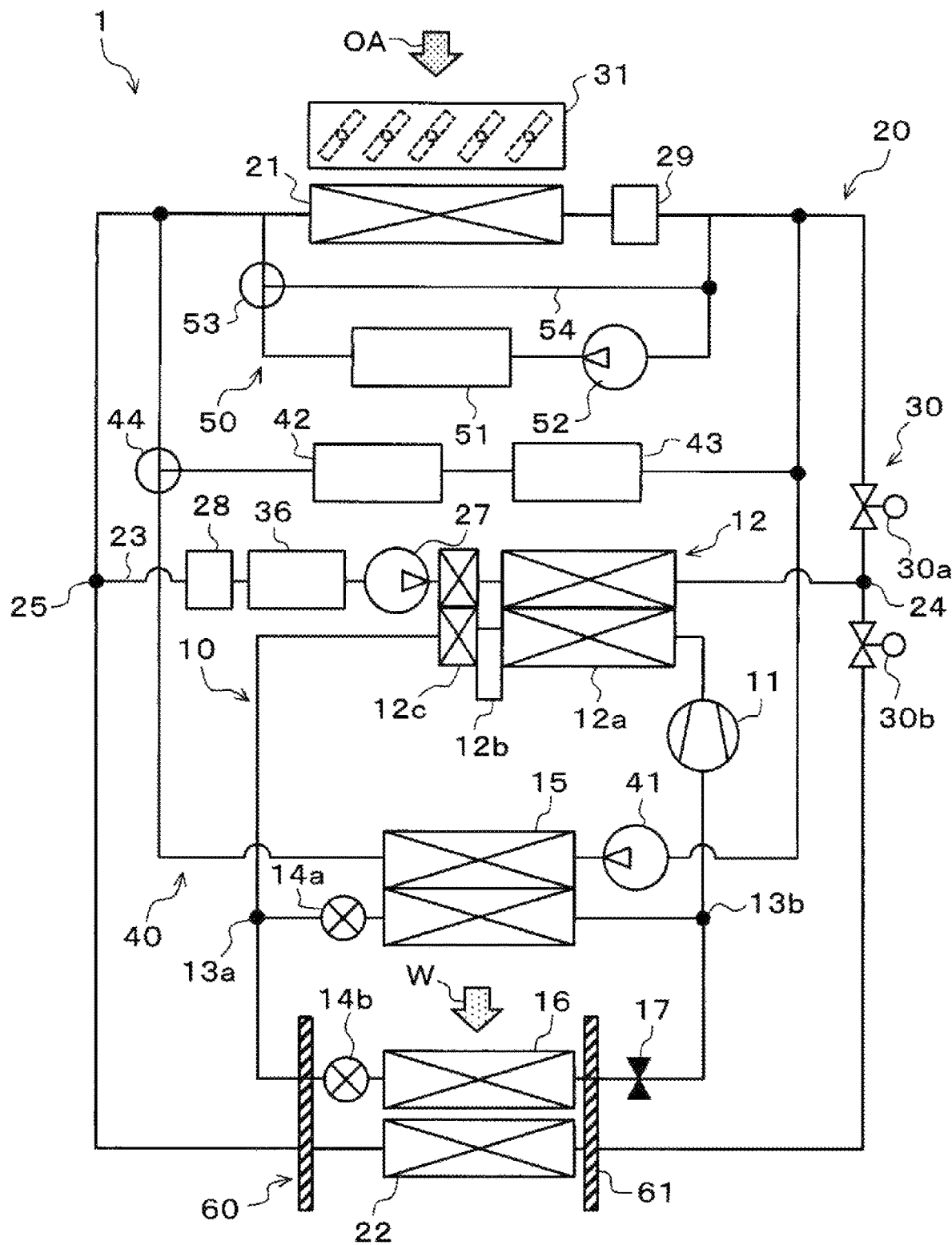
FIG. 7 is an overall configuration diagram of a vehicular air conditioner according to a fourth embodiment.

As illustrated in FIG. 7, in a vehicular air conditioner 1 according to the fourth embodiment, the heating device 36 is disposed in the common passage 23 of the high-temperature side cooling water circuit 20. The heating device 36 has a water jacket through which the cooling water of the common passage 23 flows. Therefore, the heat generated by the heating device 36 is absorbed by the cooling water passing through the water jacket, and thereby heat transfers the high-temperature side cooling water circuit 20. The heating device 36 may be, for example, a configuration device of an advanced driver-assistance system.

Advanced driver-assistance systems (ADAS) are systems that have been developed to automate, adapt, and enhance vehicle systems for safe and better driving. Advanced driver-assistance systems realizes a safety function such as warning a driver of a potential problem, and an adaptive function such as headlight control automation, automatic cruise control, automatic brake control, or the like.

The heating device 36 is a configuration device of the advanced driver-assistance system, and generates heat in accordance with an operation of the advanced driver-assistance system. Thus, the heating device 36 functions as an auxiliary heat source by providing exhaust heat generated during operation.

A difference between the electric heater 26 as the auxiliary heat source and the heating device 36 will be described. As described above, the electric heater 26 is disposed to heat the cooling water flowing through the common passage 23, and is configured to be able to arbitrarily adjust an amount of heat generation by the electric heater 26 under control of a control device 70.

On the other hand, since the heating device 36 as the auxiliary heat source generates heat in accordance with the operation of the advanced driver-assistance system, the amount of heat generation is affected by an operating mode of the advanced driver-assistance system. That is, the amount of heat generated by the heating device 36 is configured to be difficult to be arbitrarily adjusted by the control of the control device 70. The heating device 36 needs to cool the heating device 36 itself in order to surely exhibit its function when the advanced driver-assistance system operates.

As illustrated in FIG. 4, in the common passage 23 of the high-temperature side cooling water circuit 20, an inlet side of a water passage in the heating device 36 is connected to an outlet side of a merging portion 25 via a first reserve tank 28. An outlet side of the water passage in the heating device 36 is connected to a suction port side of a high-temperature side pump 27.

A discharge port side of the high-temperature side pump 27 is connected to an inlet side of a water passage in a water-refrigerant heat exchanger 12. An outlet side of the water passage in the water-refrigerant heat exchanger 12 is connected to an inflow port side of a branching portion 24. The rest of the configuration of the high-temperature side cooling water circuit 20 according to the fourth embodiment is the same as that of the high-temperature side cooling water circuit 20 according to the first embodiment.

In the fourth embodiment, the heating device 36 is positioned on an upstream side of the branching portion 24 with respect to a flow direction of the cooling water in the common passage 23. More specifically, the heating device 36 is disposed on the upstream side of a branching portion 24 and the water-refrigerant heat exchanger 12 with respect to the flow direction of the cooling water in the common passage 23. The high-temperature side pump 27 is disposed between the heating device 36, which is an auxiliary heat source, and the water-refrigerant heat exchanger 12 in the common passage 23.

Next, an example of each of driving modes of a cooling mode, a heating mode, and a defrosting mode in the vehicular air conditioner 1 according to the fourth embodiment configured as described above will be described.

(a) Cooling Mode

In a refrigeration cycle system 10 of the cooling mode according to the fourth embodiment, a refrigerant circuit circulating in the order of a compressor 11, the water-refrigerant heat exchanger 12, one side of a refrigerant branching portion 13a, a first expansion valve 14a, a chiller 15, a refrigerant merging portion 13b, and the compressor 11 is configured. A refrigerant circuit circulating in the order of the compressor 11, the water-refrigerant heat exchanger 12, the other side of the refrigerant branching portion 13a, a second expansion valve 14b, an interior evaporator 16, an evaporation pressure regulation valve 17, a refrigerant merging portion 13b, and the compressor 11 is configured in parallel.

In the high-temperature side cooling water circuit 20 of the cooling mode, operations of configuration devices are controlled in the same manner as those in the first embodiment. As a result, a cooling water circuit circulating in the order of the high-temperature side pump 27, the water-refrigerant heat exchanger 12, the branching portion 24, the first electromagnetic valve 30a, the second reserve tank 29, the radiator 21, the merging portion 25, the first reserve tank 28, the heating device 36, and the high-temperature side pump 27 is configured.

In the low-temperature side cooling water circuit 40 of the cooling mode, the operation of each configuration device is controlled in the same manner as that in the first embodiment. Therefore, in the low-temperature side cooling water circuit 40, a cooling water circuit circulating in the order of the low-temperature side pump 41, the chiller 15, the low-temperature side three-way valve 44, the battery 42, the charger 43, and the low-temperature side pump 41 is configured.

In the device cooling water circuit 50 of the cooling mode, a cooling water circuit is configured in which the cooling water circulates in the order of a device pump 52, a vehicle-mounted device 51, a device three-way valve 53, a bypass passage 54, and a device pump 52.

As described above, also in the cooling mode in the fourth embodiment, similar to the first embodiment, since a ventilation air W is capable of being cooled by an interior evaporator 16, cooling of the vehicle cabin is capable of being realized. Since the chiller 15 is capable of cooling the cooling water of the low-temperature side cooling water circuit 40, cooling of the battery 42 and the charger 43 is capable of being realized.

According to the circuit configuration of the high-temperature side cooling water circuit 20 in the cooling mode, the cooling water radiated to the outside air OA by the radiator 21 is capable of flowing into the heating device 36 as it is without being heated by the water-refrigerant heat exchanger 12. Therefore, it is possible to cool the heating device 36 which generates heat by the operation of the advanced driver-assistance system, and it is possible to appropriately maintain a temperature environment of the advanced driver-assistance system.

(b) Heating Mode

In the refrigeration cycle system 10 of the heating mode according to the fourth embodiment, a refrigerant circuit circulating in the order of the compressor 11, the water-refrigerant heat exchanger 12, one side of the refrigerant branching portion 13a, the first expansion valve 14a, the chiller 15, the refrigerant merging portion 13b, and the compressor 11 is configured.

In the high-temperature side cooling water circuit 20 of the heating mode, the operation of the configuration device is controlled in the same manner as that in the heating mode of the first embodiment. Therefore, a cooling water circuit circulating in the order of the high-temperature side pump 27, the water-refrigerant heat exchanger 12, the branching portion 24, the second electromagnetic valve 30b, the heater core 22, the merging portion 25, the first reserve tank 28, the heating device 36, and the high-temperature side pump 27 is configured.

In the low-temperature side cooling water circuit 40 of the heating mode, a cooling water circuit flowing in the order of the low-temperature side pump 41, the chiller 15, the low-temperature side three-way valve 44, the battery 42, the charger 43, and the low-temperature side pump 41 is configured. A cooling water circuit circulating in the order of the low-temperature side pump 41, the chiller 15, the low-temperature side three-way valve 44, the radiator 21, the second reserve tank 29, and the low-temperature side pump 41 is configured in parallel.

In the device cooling water circuit 50 of the heating mode, a cooling water circuit in which cooling water circulates in the order of the device pump 52, the vehicle-mounted device 51, the device three-way valve 53, the bypass passage 54, and the device pump 52 is configured.

Therefore, in the heating mode, the vehicular air conditioner 1 heats the ventilation air W by the heater core 22 and blows the ventilation air W into the vehicle cabin, whereby the vehicle cabin is capable of being heated. That is, in the heating mode, the vehicular air conditioner 1 is capable of drawing up heat absorbed from the battery 42, the charger 43, and the outside air OA in the low-temperature side cooling water circuit 40 in the refrigeration cycle system 10, and use the heat for heating the ventilation air W via the high-temperature side cooling water circuit 20.

In the vehicular air conditioner 1 of the heating mode, the cooling water of the high-temperature side cooling water circuit 20 is capable of being heated by the exhaust heat of the heating device 36 as an auxiliary heat source. Therefore, when the amount of heat added to the water-refrigerant heat exchanger 12 is insufficient to realize a target blowing temperature TAO in the heater core 22, an insufficient amount is capable of being compensated for by effectively utilizing the exhaust heat of the heating device 36.

The heating device 36 is disposed on an upstream side of the branching portion 24 in the common passage 23 of the high-temperature side cooling water circuit 20, and more specifically, is disposed on the upstream side of the branching portion 24 and the water-refrigerant heat exchanger 12.

Therefore, in the high-temperature side cooling water circuit 20, the device and the length in the passage from the heating device 36, which is the auxiliary heat source, to the heater core 22 is capable of being reduced as much as possible while considering the cooling of the heating device 36 in the cooling mode. That is, the heat generated by the heating device 36 is capable of being utilized as efficiently as possible for heating the vehicle cabin.

(c) Defrosting Mode

In a refrigeration cycle system 10 of the defrosting mode according to the fourth embodiment, a refrigerant circuit circulating in the order of the compressor 11, the water-refrigerant heat exchanger 12, one side of the refrigerant branching portion 13*a*, the first expansion valve 14*a*, the chiller 15, the refrigerant merging portion 13*b*, and the compressor 11 is configured.

In the high-temperature side cooling water circuit 20 of the defrosting mode, the operation of the configuration device is controlled in the same manner as that in the defrosting mode of the first embodiment. Therefore, a cooling water circuit circulating in the order of the high-temperature side pump 27, the water-refrigerant heat exchanger 12, the branching portion 24, the first electromagnetic valve 30*a*, the second reserve tank 29, the radiator 21, the merging portion 25, the first reserve tank 28, the heating device 36, and the high-temperature side pump 27 is configured.

In the low-temperature side cooling water circuit 40 of the defrosting mode, a cooling water circuit flowing in the order of the low-temperature side pump 41, the chiller 15, the low-temperature side three-way valve 44, the battery 42, the charger 43, and the low-temperature side pump 41 is configured.

In the device cooling water circuit 50 of the defrosting mode, a cooling water circuit in which the cooling water circulates in the order of the device pump 52, the vehicle-mounted device 51, the device three-way valve 53, the bypass passage 54, and the device pump 52 is configured.

Therefore, in the defrosting mode, the heat absorbed from the battery 42 and the charger 43 is capable of being drawn up by the refrigeration cycle system 10 in the low-temperature side cooling water circuit 40 and used for the defrosting of the radiator 21 via the high-temperature side cooling water circuit 20.

In the vehicular air conditioner 1 of the defrosting mode, the cooling water of the high-temperature side cooling water circuit 20 is capable of being heated by the exhaust heat of the heating device 36 as the auxiliary heat source. Therefore, even when the amount of heat added by the water-refrigerant heat exchanger 12 is insufficient to realize defrosting of the radiator 21, the insufficient amount is capable of being compensated for by effectively utilizing the heat generated by the heating device 36.

As illustrated in FIG. 4, the heating device 36 is disposed on the upstream side of the branching portion 24 in the common passage 23 of the high-temperature side cooling water circuit 20, and more specifically, is disposed on the upstream side of the branching portion 24 and the water-refrigerant heat exchanger 12.

Therefore, in the high-temperature side cooling water circuit 20, the device and the length in the passage from the heating device 36, which is the auxiliary heat source, to the radiator 21 is capable of being reduced as much as possible while considering the cooling of the heating device 36 in the cooling mode. That is, the exhaust heat from the heating device 36 is capable of being utilized as efficiently as possible for the defrosting of the radiator 21 while considering the cooling of the heating device 36 in the cooling mode.

As described above, according to the vehicular air conditioner 1 of the fourth embodiment, the operational effects achieved from the common configuration and operation with the first embodiment are capable of being obtained in the same manner as those in the first embodiment.

In the common passage 23 of the high-temperature side cooling water circuit 20, the heating device 36 is disposed on the upstream side of the branching portion 24. More specifically, the heating device 36 is disposed on the upstream side of the branching portion 24 and the water-refrigerant heat exchanger 12 in the common passage 23.

Therefore, also in both a case where the cooling water of the high-temperature side cooling water circuit 20 is allowed to flow into the radiator 21 side and a case where the cooling water is allowed to flow into the heater core 22 side, the passage length and the number of the devices from the heating device 36 are capable of being restricted to be small while considering the cooling of the heating device 36 in the cooling mode.

That is, according to the vehicular air conditioner 1, when the heating device 36 is used as the auxiliary heat source, also in both the case of being used for heating assistance and the case of being used for defrosting assistance, it is possible to efficiently use the heat loss as little as possible in consideration of the cooling of the heating device 36.

As illustrated in FIG. 4, in the common passage 23 of the high-temperature side cooling water circuit 20, the high-temperature side pump 27 is disposed between the heating device 36 and the water-refrigerant heat exchanger 12 with respect to the flow of the cooling water in the common passage 23. That is, in the vehicular air conditioner 1, it is possible to reduce the cost and the power required for the high-temperature side pump 27 while considering the cooling of the heating device 36 in the cooling mode.

In the high-temperature side cooling water circuit 20, the radiator 21 for exchanging heat between the cooling water and the outside air OA is disposed. In the cooling mode, the heat of the cooling water is capable of being radiated to the outside air OA by the radiator 21, and the heating device 36 is capable of being cooled by the cooling water. In the heating mode, by absorbing heat from the outside air OA by the radiator 21, the outside air OA is capable of being used as a heating heat source.

By realizing the defrosting mode, the frosted radiator 21 is capable of being defrosted, the efficiency when the outside air OA is used as a heating heat source is capable of being restored, and the heating capacity of the vehicular air conditioner 1 is capable of being improved.

Fifth Embodiment

Next, a fifth embodiment different from the above-described each embodiment will be described with reference to FIG. 8. In the fifth embodiment, instead of the configuration of the common passage 23 of the high-temperature side cooling water circuit 20 in the vehicular air conditioner 1 according to the second embodiment, a configuration of a common passage 23 according to the fourth embodiment is employed.

That is, in the common passage 23 of a high-temperature side cooling water circuit 20 in the fifth embodiment, between a merging portion 25 and a branching portion 24, configuration devices are disposed in the order of the common passage 23, a first reserve tank 28, a heating device 36, a high-temperature side pump 27, a water-refrigerant heat exchanger 12, and a branching portion 24. Since the configurations of the complex heat exchanger 35 and the heating device 36 in the fifth embodiment have already been described, redundant description thereof is omitted.

Next, an example of each of the driving modes of a cooling mode, a heating mode, and a defrosting mode in the vehicular air conditioner 1 according to the fifth embodiment configured as described above will be described.

(a) Cooling Mode

In a refrigeration cycle system 10 of the cooling mode according to the fifth embodiment, a refrigerant circuit circulating in the order of a compressor 11, the water-refrigerant heat exchanger 12, one side of a refrigerant branching portion 13a, a first expansion valve 14a, a chiller 15, a refrigerant merging portion 13b, and the compressor 11 is configured. A refrigerant circuit circulating in the order of the compressor 11, the water-refrigerant heat exchanger 12, the other side of the refrigerant branching portion 13a, a second expansion valve 14b, an interior evaporator 16, an evaporation pressure regulation valve 17, a refrigerant merging portion 13b, and the compressor 11 is configured in parallel.

In the high-temperature side cooling water circuit 20 in the cooling mode, operations of the configuration devices are controlled in the same manner as those in the second embodiment. Therefore, a cooling water circuit circulating in the order of the high-temperature side pump 27, the water-refrigerant heat exchanger 12, the branching portion 24, the first electromagnetic valve 30a, the heat dissipating portion 35a of the complex heat exchanger 35, the merging portion 25, the first reserve tank 28, the heating device 36, and the high-temperature side pump 27 is configured.

Therefore, even in the cooling mode of the fifth embodiment, since the cooling water radiated to an outside air OA by the heat dissipating portion 35a is capable of flowing into the heating device 36, the heating device 36 is capable of being cooled by circulation of the cooling water.

In the low-temperature side cooling water circuit 40 of the cooling mode, the operation of each configuration device is controlled in the same manner as that in the second embodiment. Therefore, in the low-temperature side cooling water circuit 40, a cooling water circuit circulating in the order of the low-temperature side pump 41, the chiller 15, the low-temperature side three-way valve 44, the battery 42, the charger 43, and the low-temperature side pump 41 is configured.

In the device cooling water circuit 50 of the cooling mode, a cooling water circuit is configured in which the cooling water circulates in the order of a device pump 52, a vehicle-mounted device 51, a device three-way valve 53, a bypass passage 54, and a device pump 52.

As described above, also in the cooling mode in the fifth embodiment, since the ventilation air W is capable of being cooled by the interior evaporator 16 in the same manner as that in the second embodiment, the cooling in the vehicle cabin is capable of being realized. Since the chiller 15 is capable of cooling the cooling water of the low-temperature side cooling water circuit 40, cooling of the battery 42 and the charger 43 is capable of being realized.

(b) Heating Mode

In the refrigeration cycle system 10 of the heating mode according to the fifth embodiment, a refrigerant circuit circulating in the order of the compressor 11, the water-refrigerant heat exchanger 12, one side of the refrigerant branching portion 13a, the first expansion valve 14a, the chiller 15, the refrigerant merging portion 13b, and the compressor 11 is configured.

In the high-temperature side cooling water circuit 20 of the heating mode, operations of the configuration devices are controlled in the same manner as those in the heating mode of the second embodiment. Therefore, a cooling water circuit circulating in the order of the high-temperature side pump 27, the water-refrigerant heat exchanger 12, the branching portion 24, the second electromagnetic valve 30b, the heater core 22, the merging portion 25, the first reserve tank 28, the heating device 36, and the high-temperature side pump 27 is configured.

In the low-temperature side cooling water circuit 40 of the heating mode, a cooling water circuit flowing in the order of the low-temperature side pump 41, the chiller 15, the low-temperature side three-way valve 44, the battery 42, the charger 43, and the low-temperature side pump 41 is configured. A cooling water circuit circulating in the order the low-temperature side pump 41, the chiller 15, the low-temperature side three-way valve 44, the heat absorbing portion 35b of the complex heat exchanger 35, the second reserve tank 29, and the low-temperature side pump 41 is configured in parallel.

In the device cooling water circuit 50 of the heating mode, a cooling water circuit in which cooling water circulates in the order of the device pump 52, the vehicle-mounted device 51, the device three-way valve 53, the bypass passage 54, and the device pump 52 is configured.

Therefore, in the heating mode, the vehicular air conditioner 1 heats the ventilation air W by the heater core 22 and blows the ventilation air W into the vehicle cabin, whereby the vehicle cabin is capable of being heated. That is, the vehicular air conditioner 1 is capable of drawing up heat absorbed from the battery 42, the charger 43, and the outside air OA in the refrigeration cycle system 10 and using the heat for the heating of the ventilation air W via the high-temperature side cooling water circuit 20.

In the vehicular air conditioner 1 of the heating mode, the cooling water of the high-temperature side cooling water circuit 20 is capable of being heated by the heating device 36 as an auxiliary heat source. Therefore, even when the amount of heat added in the water-refrigerant heat exchanger 12 is insufficient to realize a target blowing temperature TAO in the heater core 22, the insufficient amount is capable of being compensated for by the exhaust heat of the heating device 36.

The heating device 36 is disposed on an upstream side of the branching portion 24 in the common passage 23 of the high-temperature side cooling water circuit 20, and more specifically, is disposed on the upstream side of the branching portion 24 and the water-refrigerant heat exchanger 12. Therefore, in the high-temperature side cooling water circuit 20, the heat generated by the heating device 36, which is the auxiliary heat source, is capable of being efficiently utilized for the heating of the vehicle cabin while considering the cooling of the heating device 36 in the cooling mode.

(c) Defrosting Mode

In the refrigeration cycle system 10 of the defrosting mode according to the fifth embodiment, a refrigerant circuit circulating in the order of the compressor 11, the water-refrigerant heat exchanger 12, one side of the refrigerant branching portion 13a, the first expansion valve 14a, the chiller 15, the refrigerant merging portion 13b, and the compressor 11 is configured.

In the high-temperature side cooling water circuit 20 of the defrosting mode, the operations of the configuration devices are controlled in the same manner as those in the defrosting mode of the second embodiment. Therefore, a cooling water circuit circulating in the order of the high-temperature side pump 27, the water-refrigerant heat exchanger 12, the branching portion 24, the first electromagnetic valve 30a, the heat dissipating portion 35a of the complex heat exchanger 35, the merging portion 25, the first reserve tank 28, the heating device 36, and the high-temperature side pump 27 is configured.

In the low-temperature side cooling water circuit 40 of the defrosting mode, a cooling water circuit flowing in the order of the low-temperature side pump 41, the chiller 15, the low-temperature side three-way valve 44, the battery 42, the charger 43, and the low-temperature side pump 41 is configured.

In the device cooling water circuit 50 of the defrosting mode, a cooling water circuit in which the cooling water circulates in the order of the device pump 52, the vehicle-mounted device 51, the device three-way valve 53, the bypass passage 54, and the device pump 52 is configured.

Therefore, in the defrosting mode, the heat absorbed from the battery 42 and the charger 43 is capable of being drawn up by the refrigeration cycle system 10 in the low-temperature side cooling water circuit 40 and used for defrosting the heat absorbing portion 35b in the complex heat exchanger 35 via the high-temperature side cooling water circuit 20.

In the complex heat exchanger 35, the heat dissipating portion 35a and the heat absorbing portion 35b are connected by heat exchange fins, and are configured to be capable of performing the heat transfer. Therefore, by allowing the heated cooling water of the high-temperature side cooling water circuit 20 to flow into the heat dissipating portion 35a of the complex heat exchanger 35, the defrosting of the frosted heat absorbing portion 35b is capable of being performed, and the heating capacity is capable of being restored.

In the vehicular air conditioner 1 of the defrosting mode, the cooling water of the high-temperature side cooling water circuit 20 is capable of being heated by using the exhaust heat of the heating device 36 as the auxiliary heat source. Therefore, in a case where the amount of heat added to the water-refrigerant heat exchanger 12 is insufficient to realize the defrosting of the heat absorbing portion 35b in the complex heat exchanger 35, the insufficient amount is capable of being compensated for by utilizing the exhaust heat of the heating device 36.

Figure 8:
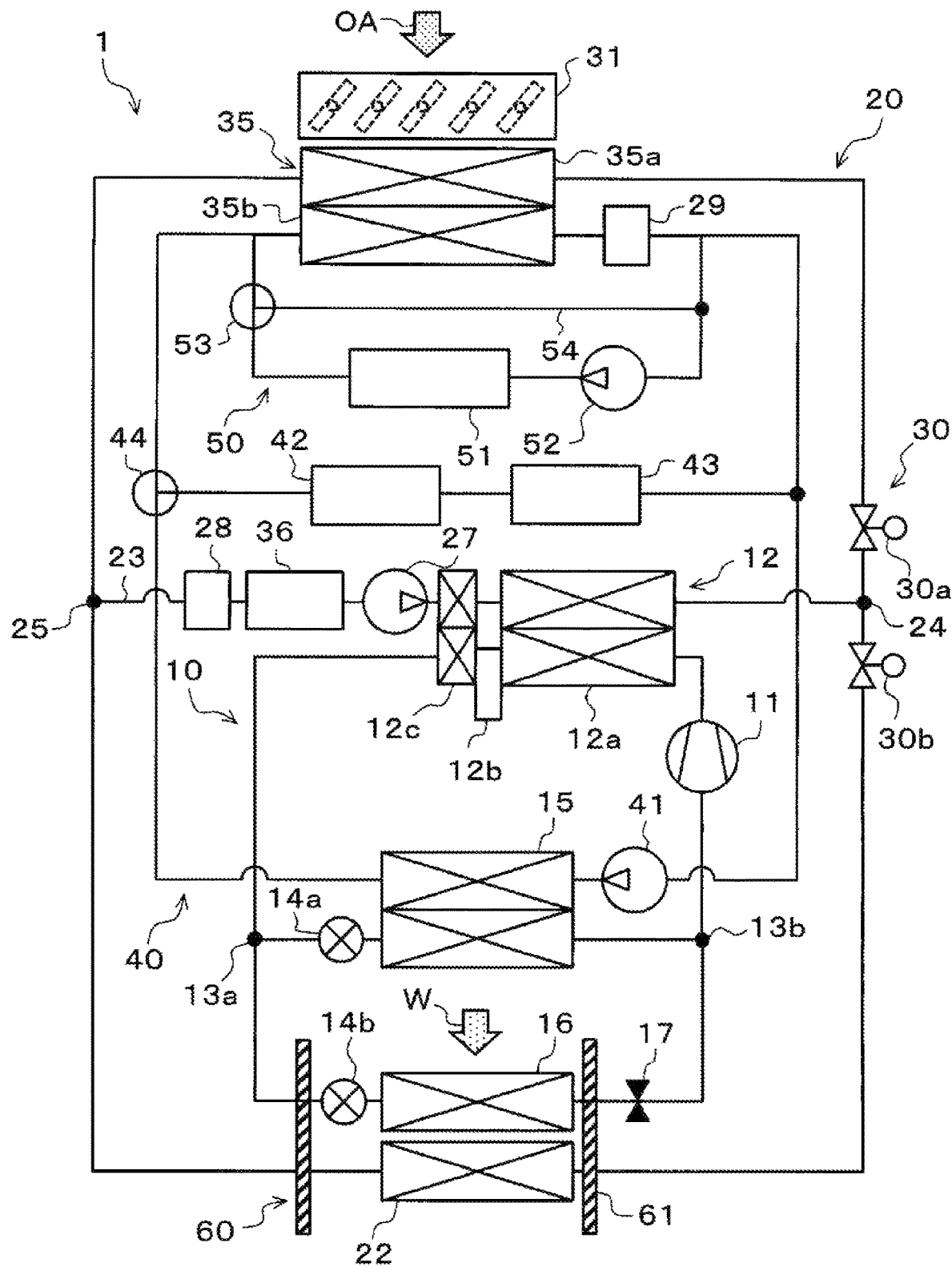
FIG. 8 is an overall configuration diagram of a vehicular air conditioner according to a fifth embodiment.

As illustrated in FIG. 8, the heating device 36 is disposed on an upstream side of the branching portion 24 in the common passage 23 of the high-temperature side cooling water circuit 20, and more specifically, is disposed on the upstream side of the branching portion 24 and the water-refrigerant heat exchanger 12.

Therefore, in the high-temperature side cooling water circuit 20, the device and the length in the passage from the heating device 36, which is the auxiliary heat source, to the heat absorbing portion 35b of the complex heat exchanger 35 is capable of being reduced as much as possible while considering the cooling of the heating device 36 in the cooling mode. The exhaust heat of the heating device 36 is capable of being efficiently utilized for the defrosting of the heat absorbing portion 35b in the complex heat exchanger 35 while considering the cooling of the heating device 36.

In the device cooling water circuit 50 of the defrosting mode according to the fifth embodiment, the circuit configuration of the cooling water circuit may be changed by controlling the operation of the device three-way valve 53. That is, in the device cooling water circuit 50, a cooling water circuit may be used in which the cooling water circulates in the order of the device pump 52, the vehicle-mounted device 51, the device three-way valve 53, the heat absorbing portion 35b of the complex heat exchanger 35, the second reserve tank 29, and the device pump 52.

With the circuit configuration, the cooling water that absorbs the exhaust heat of the vehicle-mounted device 51 is capable of being supplied to the heat absorbing portion 35b of the frosted complex heat exchanger 35, so that the exhaust heat of the vehicle-mounted device 51 is capable of being used for the defrosting of the heat absorbing portion 35b.

As described above, according to the vehicular air conditioner 1 according to the fifth embodiment, the operational effects achieved from the common configuration and operation with the above-described each embodiment are capable of being obtained in the same manner as those in the above-described embodiments.

That is, with respect to the disposition of the configuration devices in the common passage 23 of the high-temperature side cooling water circuit 20, the operational effects achieved from the common configuration and operation with the fourth embodiment are capable of being obtained in the same manner as those in the fourth embodiment.

With respect to the point that the complex heat exchanger 35 is employed instead of the radiator 21, the operational effects achieved from the common configuration and operation with the second embodiment are capable of being obtained in the same manner as those in the second embodiment.

Sixth Embodiment

Figure 9:
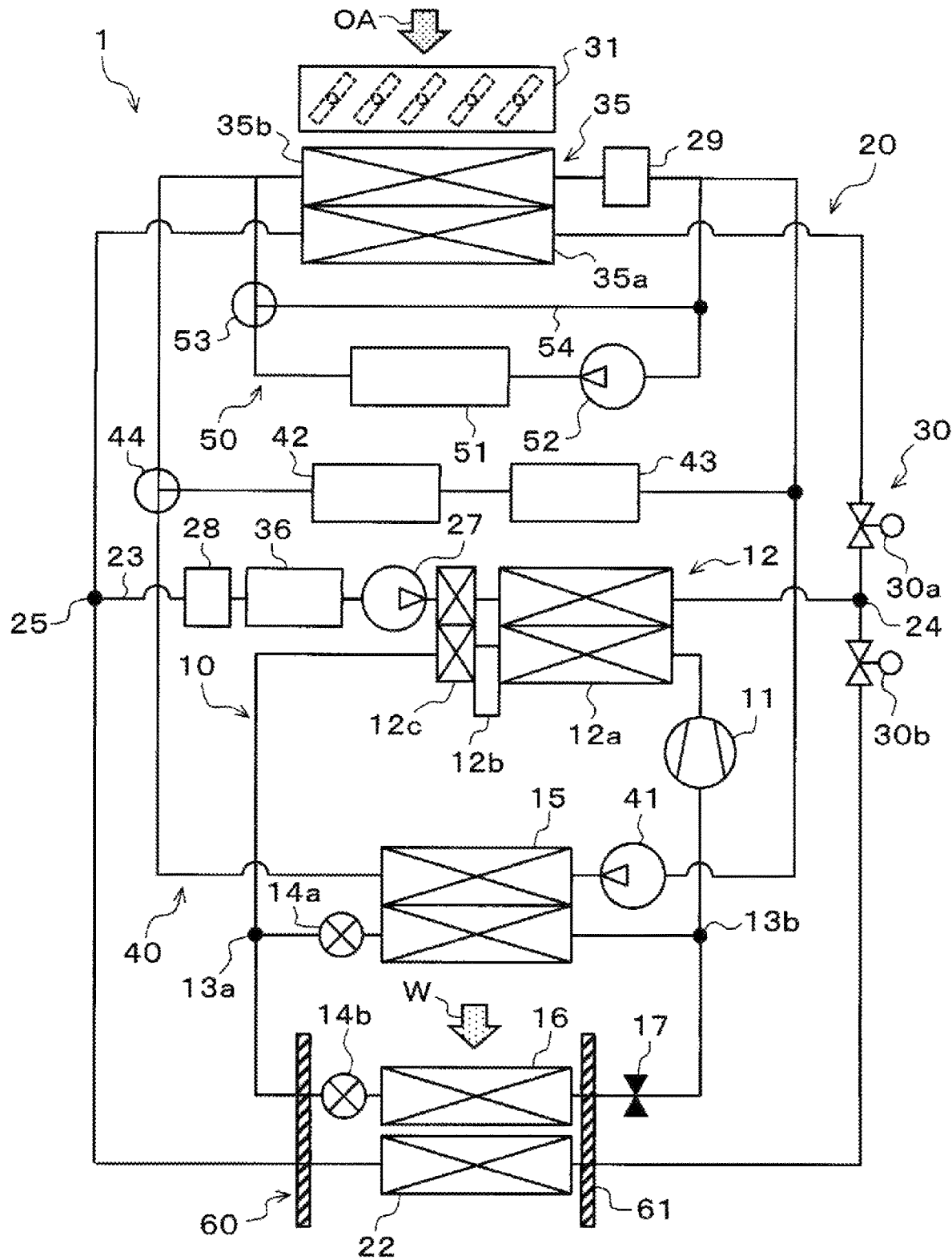
FIG. 9 is an overall configuration diagram of a vehicular air conditioner according to a sixth embodiment.

Next, a sixth embodiment different from the above-described each embodiment will be described with reference to FIG. 9. In the sixth embodiment, instead of the configuration of the common passage 23 of the high-temperature side cooling water circuit 20 in the vehicular air conditioner 1 according to the third embodiment, the configuration of the common passage 23 according to the fourth embodiment is employed.

That is, in the common passage 23 of the high-temperature side cooling water circuit 20 in the sixth embodiment, configuration devices are disposed between a merging portion 25 and a branching portion 24 in the order of a common passage 23, a first reserve tank 28, a heating device 36, a high-temperature side pump 27, a water-refrigerant heat exchanger 12, and a branching portion 24. Since the configurations of the complex heat exchanger 35 and the heating device 36 in the sixth embodiment have already been described, redundant description thereof is omitted.

In order to realize a cooling mode, a heating mode, and a defrosting mode, the vehicular air conditioner 1 according to the sixth embodiment controls an operation of each configuration device in the same manner as that in the fifth embodiment. In this respect, since the description has already been made in the fifth embodiment, redundant description is omitted.

As described above, according to the vehicular air conditioner 1 according to the sixth embodiment, the operational effects achieved from the common configuration and operation with the above-described each embodiment are capable of being obtained in the same manner as those in the above-described each embodiment.

That is, with respect to the disposition of the configuration devices in the common passage 23 of the high-temperature side cooling water circuit 20, the operational effects achieved from the common configuration and operation with the fourth embodiment are capable of being obtained in the same manner as those in the fourth embodiment.

With respect to the point that the complex heat exchanger 35 is employed instead of the radiator 21, the operational effects achieved from the common configuration and operation with the third embodiment are capable of being obtained in the same manner as those in the third embodiment.

Seventh Embodiment

Next, a seventh embodiment different from the above-described each embodiment will be described with reference to FIG. 10. In the seventh embodiment, an electric heater 26 and a heating device 36 are employed as auxiliary heat sources in a common passage 23, and a disposition of the configuration devices in the common passage 23 of a high-temperature side cooling water circuit 20 is changed. Other configurations are the same as those of the first embodiment, and therefore redundant description thereof is omitted.

Figure 10:
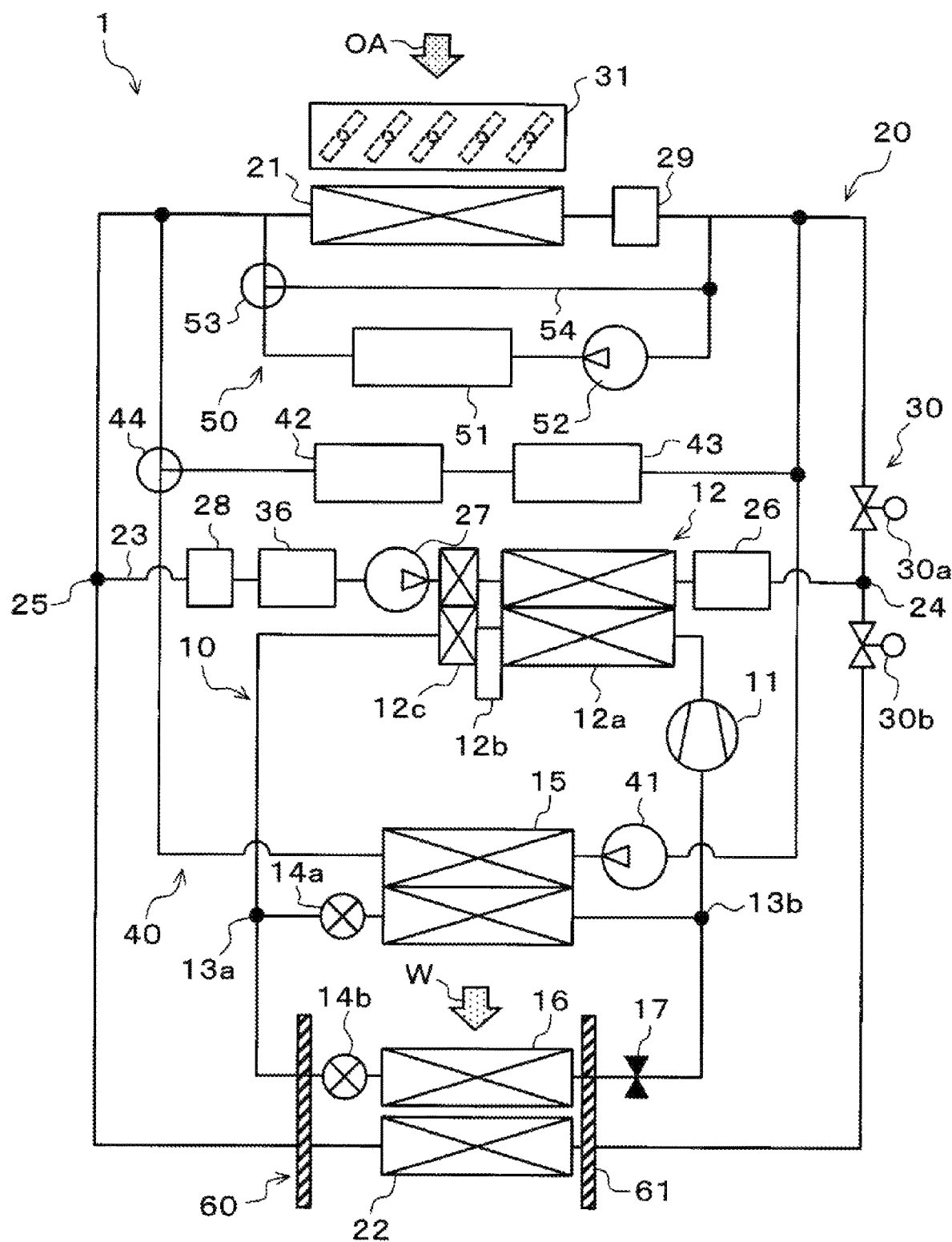
FIG. 10 is an overall configuration diagram of a vehicular air conditioner according to a seventh embodiment.

As illustrated in FIG. 10, in a vehicular air conditioner 1 according to the seventh embodiment, the heating device 36 is additionally disposed in the common passage 23 of the high-temperature side cooling water circuit 20 as compared with the first embodiment. The configuration of the heating device 36 is the same as that of the fourth embodiment, and is a second auxiliary heat source.

In the common passage 23 of the high-temperature side cooling water circuit 20, an inlet side of a water passage in the heating device 36 is connected to an outlet side of a merging portion 25 via a first reserve tank 28. An outlet side of the water passage in the heating device 36 is connected to a suction port side of a high-temperature side pump 27.

A discharge port side of the high-temperature side pump 27 is connected to an inlet side of a water passage in a water-refrigerant heat exchanger 12. The outlet side of the water passage in the water-refrigerant heat exchanger 12 is connected to the inlet side of the water passage in the electric heater 26. The outlet side of the water passage in the electric heater 26 is connected to the inflow port side of the branching portion 24. The electric heater 26 is a first auxiliary heat source.

The other configuration of the high-temperature side cooling water circuit 20 according to the seventh embodiment is the same as that of the high-temperature side cooling water circuit 20 according to the first embodiment.

In the seventh embodiment, the electric heater 26 is disposed on an upstream side of the branching portion 24 with respect to the flow of the cooling water in the common passage 23. Specifically, the electric heater 26 is disposed between the water-refrigerant heat exchanger 12 and the branching portion 24 in the common passage 23.

The heating device 36 is located on the upstream side of the branching portion 24 with respect to the flow direction of the cooling water in the common passage 23. More specifically, the heating device 36 is disposed on the upstream side of a branching portion 24 and the water-refrigerant heat exchanger 12 with respect to the flow direction of the cooling water in the common passage 23.

That is, in the common passage 23 of the high-temperature side cooling water circuit 20 according to the seventh embodiment, a merging portion 25, a first reserve tank 28, a heating device 36, a high-temperature side pump 27, a water-refrigerant heat exchanger 12, an electric heater 26, and a branching portion 24 are disposed in this order in accordance with the flow of the cooling water.

The vehicular air conditioner 1 according to the seventh embodiment configured as described above is capable of realizing each of driving modes of a cooling mode, a heating mode, and a defrosting mode. The contents of the operations in the cooling mode, the heating mode, and the defrosting mode are the same as those in the first embodiment and the fourth embodiment described above.

As described above, according to the vehicular air conditioner 1 according to the seventh embodiment, the operational effects achieved from the common configuration and operation with the above-described each embodiment is capable of being obtained in the same manner as those in the above-described embodiments.

That is, according to the vehicular air conditioner 1, when the electric heater 26 and the heating device 36 are used as the auxiliary heat sources, also in both a case of being used for the heating assistance and a case of being used for the defrosting assistance, the electric heater 26 is capable of being efficiently used. At the same time, also in both cases where the heating assistance and the defrosting assistance are used, heat loss is capable of being restricted as much as possible and the heat is capable of being efficiently used in consideration of the cooling of the heating device 36.

The present disclosure is not limited to the embodiments described above, and various modifications are capable of being made as follows within a range not departing from the spirit of the present disclosure.

In the embodiments described above, an electric expansion valve is employed as the first expansion valve 14a and the second expansion valve 14b in the refrigeration cycle system 10, but the present disclosure is not limited to the aspect. Various aspects are capable of being employed as long as the high-pressure refrigerant is capable of being reduced in pressure in the refrigeration cycle system 10. For example, the second expansion valve 14b may be changed to a thermal expansion valve while the first expansion valve 14a is the electric expansion valve.

In the embodiments described above, the water-refrigerant heat exchanger 12 is employed as a subcooling condenser, but the present disclosure is not limited to the aspect. As the water-refrigerant heat exchanger 12, an aspect may be employed in which the receiver portion 12b and the subcooling unit 12c are not provided and the condensing portion 12a is provided.

In the embodiments described above, the flow rate adjuster 30 in the high-temperature side cooling water circuit 20 includes the first electromagnetic valve 30a and the second electromagnetic valve 30b, but the present disclosure is not limited to the aspect. As the flow rate adjuster 30, various aspects are capable of being employed as long as the flow rate of the heat medium on one outlet side of the branching portion 24 and the flow rate of the heat medium on the other outflow port side of the branching portion 24 are capable of being adjusted. For example, the flow rate adjuster 30 may include a three-way valve disposed at the position of the branching portion 24.

The flow rate adjuster 30 is an electromagnetic valve capable of adjusting the opening degree of the first electromagnetic valve 30a and the second electromagnetic valve 30b, but the flow rate adjuster 30 is not limited to the aspect. At least, any configuration may be employed as long as the switching of the cooling water circuit in the high-temperature side cooling water circuit 20 is capable of being realized, and as the first electromagnetic valve 30a and the second electromagnetic valve 30b, an open-close valve capable of fully opening and fully closing the cooling water passage may be used.

In the fourth to sixth embodiments described above, as the heating device 36, a configuration device of the advanced driver-assistance system is employed, but the present disclosure is not limited to the aspect. As the heating device 36, various devices are capable of being employed as long as they are mounted on a vehicle and generate secondary heat in accordance with an operation for exhibiting a predetermined function. For example, an inverter, a motor generator, or the like may be employed as the heating device 36.

In the above-described embodiments, as the driving modes, three driving modes, that is, the cooling mode, the heating mode, and the defrosting mode, are described, but the present disclosure is not limited to the aspect. For example, the dehumidification heating mode in which the ventilation air W cooled by the interior evaporator 16 is heated by the heater core 22 and supplied to the vehicle cabin is capable of being realized as the driving mode. In this case, the configuration devices of the vehicular air conditioner 1 are controlled so that the low-pressure refrigerant whose pressure is reduced by the second expansion valve 14b flows into the interior evaporator 16, the second electromagnetic valve 30b is opened by the high-temperature side cooling water circuit 20, and the heated cooling water flows into the heater core 22.

The disposition of the configuration devices in the common passage 23 of the seventh embodiment described above is capable of being applied to circuit configurations of other cooling water circuits. For example, in the common passage 23 of the high-temperature side cooling water circuit 20 according to the second and fifth embodiments, the merging portion 25, the first reserve tank 28, the heating device 36, the high-temperature side pump 27, the water-refrigerant heat exchanger 12, the electric heater 26, and the branching portion 24 may be disposed in this order in accordance with the flow of the cooling water. In this case, the operation contents of the second and fifth embodiments is capable of being applied to the operation content of each driving mode.

Similarly, in the common passage 23 of the high-temperature side cooling water circuit 20 according to the third and sixth embodiments, the merging portion 25, the first reserve tank 28, the heating device 36, the high-temperature side pump 27, the water-refrigerant heat exchanger 12, the electric heater 26, and the branching portion 24 may be disposed in this order in accordance with the flow of the cooling water. In this case, the operation contents of the third and sixth embodiments are capable of being applied to the operation content of each driving mode.

Although the present disclosure is described in accordance with the examples, it is understood that the present disclosure is not limited to such examples or structures. The present disclosure includes various modifications and variations within the scope of equivalents. In addition, various combinations and aspects, as well as other combinations and aspects that include only one element, more, or less, are also within the scope of the present disclosure.

What is claimed is:

1. A vehicular air conditioner comprising:
a refrigeration cycle system including:
   a compressor configured to compress and discharge a refrigerant;
   a heat medium-refrigerant heat exchanger configured to cause the high-pressure refrigerant compressed by the compressor to release heat to a heat medium;
   a decompressor configured to decompress the high-pressure refrigerant flowing out of the heat medium-refrigerant heat exchanger; and
   a heat absorber configured to cause the low-pressure refrigerant decompressed by the decompressor to absorb heat to evaporate;
a high-temperature heat medium circuit through which the heat medium circulates such that the high-pressure refrigerant releases heat to the heat medium in the heat medium-refrigerant heat exchanger; and
a low-temperature heat medium circuit through which the heat medium circulates such that the low-pressure refrigerant absorbs heat from the heat medium in the heat absorber and the heat medium is cooled, wherein
the high-temperature heat medium circuit includes:
   an air-heat medium heat exchanger configured to exchange heat between the heat medium and an air outside of a vehicle cabin;
   a heater core configured to cause the heat medium to release heat to a ventilation air supplied into an air conditioning target space, the heater core being arranged in parallel to the air-heat medium heat exchanger;
   a branching portion at which a flow of the heat medium is divided into a flow toward the air-heat medium heat exchanger and a flow toward the heater core;
   a common passage into which the flow of the heat medium having flowed through the air-heat medium heat exchanger and the flow of the heat medium having flowed through the heater core are merged, the heat medium-refrigerant heat exchanger being arranged in the common passage;

a flow rate adjuster configured to adjust a flow amount of the heat medium toward the air-heat medium heat exchanger from the branching portion relative to a flow amount of the heat medium toward the heater core from the branching portion; and an auxiliary heat source configured to heat the heat medium, the auxiliary heat source being located in the common passage at a position upstream of the branching portion in a flow direction of the heat medium.

2. The vehicular air conditioner according to claim 1, wherein the auxiliary heat source is configured to arbitrarily adjust an amount of heat for heating the heat medium, and the auxiliary heat source is arranged in the common passage between the branching portion and the heat medium-refrigerant heat exchanger.

3. The vehicular air conditioner according to claim 2, wherein the high-temperature heat medium circuit includes a heat medium pump configured to circulate the heat medium therethrough, and the heat medium pump is arranged in the common passage at a position upstream of the heat medium-refrigerant heat exchanger in the flow direction of the heat medium.

4. The vehicular air conditioner according to claim 1, wherein the auxiliary heat source is configured to generate heat in operating, wherein an amount of the heat is not adjustable, and the auxiliary heat source is arranged in the common passage at a position upstream of both the branching portion and the heat medium-refrigerant heat exchanger in the flow direction of the heat medium.

5. The vehicular air conditioner according to claim 4, wherein the high-temperature heat medium circuit includes a heat medium pump configured to circulate the heat medium therethrough, and the heat medium pump is arranged in the common passage between the auxiliary heat source and the heat medium-refrigerant heat exchanger.

6. The vehicular air conditioner according to claim 1, wherein the high-temperature heat medium circuit includes a heat medium pump configured to circulate the heat medium therethrough, the auxiliary heat source includes:

a first auxiliary heat source configured to arbitrarily adjust an amount of heat for heating the heat medium; and a second auxiliary heat source configured to generate heat in operating, wherein an amount of the heat is not adjustable, the first auxiliary heat source and the second auxiliary heat source are arranged in the high-temperature heat medium circuit, the heat medium pump is arranged in the common passage between the second auxiliary heat source and the heat medium-refrigerant heat exchanger, and the first auxiliary heat source is arranged in the common passage between the branching portion and the heat medium-refrigerant heat exchanger.

7. The vehicular air conditioner according to claim 1, wherein the air-heat medium heat exchanger is a radiator configured to cause the heat medium to release heat to the air outside of the vehicle cabin.

8. The vehicular air conditioner according to claim 1, wherein the air-heat medium heat exchanger is a complex heat exchanger including:

a heat dissipating portion configured to cause the heat medium flowing through the high-temperature heat medium circuit to release heat to the air outside of the vehicle cabin; and a heat absorbing portion configured to cause the heat medium flowing through the low-temperature heat medium circuit to absorb heat, and the heat dissipating portion is disposed at a position upstream of the heat absorbing portion in a direction in which the air outside of the vehicle cabin flows to the complex heat exchanger.

9. The vehicular air conditioner according to claim 1, wherein the air-heat medium heat exchanger is a complex heat exchanger including:

a heat dissipating portion configured to cause the heat medium flowing through the high-temperature heat medium circuit to release heat to the air outside of the vehicle cabin; and a heat absorbing portion configured to cause the heat medium flowing through the low-temperature heat medium circuit to absorb heat, and the heat absorbing portion is disposed at a position upstream of the heat dissipating portion in a direction in which the air outside of the vehicle cabin flows to the complex heat exchanger.

10. The vehicular air conditioner according to claim 1, wherein the air-heat medium heat exchanger is a complex heat exchanger including:

a heat dissipating portion configured to cause the heat medium flowing through the high-temperature heat medium circuit to release heat to the air outside of the vehicle cabin; and a heat absorbing portion configured to cause the heat medium flowing through the low-temperature heat medium circuit to absorb heat, and the complex heat exchanger includes a heat transfer portion configured to transfer heat between the high-temperature heat medium circuit and the low-temperature heat medium circuit.

11. The vehicular air conditioner according to claim 1, wherein the air-heat medium heat exchanger is a complex heat exchanger including:

a heat dissipating portion configured to cause the heat medium flowing through the high-temperature heat medium circuit to release heat to the air outside of the vehicle cabin; and a heat absorbing portion configured to cause the heat medium flowing through the low-temperature heat medium circuit to absorb heat.

* * * * *